United States Patent [19]
Yokomizo

[11] Patent Number: 4,748,677
[45] Date of Patent: May 31, 1988

[54] IMAGE PROCESSING APPARATUS

[75] Inventor: Yoshikazu Yokomizo, Kawagoe, Japan

[73] Assignee: Canon Kabushiki Kaisha, Tokyo, Japan

[21] Appl. No.: 789,839

[22] Filed: Oct. 21, 1985

Related U.S. Application Data

[62] Division of Ser. No. 326,269, Dec. 1, 1981, Pat. No. 4,589,034.

[30] Foreign Application Priority Data

| Dec. 5, 1980 | [JP] | Japan | 55-171878 |
| Dec. 5, 1980 | [JP] | Japan | 55-171879 |
| Dec. 5, 1980 | [JP] | Japan | 55-171880 |
| Dec. 5, 1980 | [JP] | Japan | 55-171881 |
| Dec. 5, 1980 | [JP] | Japan | 55-171882 |
| Dec. 5, 1980 | [JP] | Japan | 55-171883 |

[51] Int. Cl.$^4$ ............................................. G06K 9/38
[52] U.S. Cl. ..................................... 382/50; 358/282
[58] Field of Search ................ 358/166, 282, 284; 382/50, 52–54

[56] References Cited

U.S. PATENT DOCUMENTS

| 4,133,008 | 1/1979 | Tisue | 358/282 |
| 4,300,164 | 11/1981 | Sacks | 382/50 |
| 4,329,717 | 5/1982 | Logie et al. | 358/282 |

Primary Examiner—Leo H. Boudreau
Attorney, Agent, or Firm—Fitzpatrick, Cella, Harper & Scinto

[57] ABSTRACT

An image processing apparatus has analog image signal generator converter for converting an analog image signal generated by said analog image generator to a digital image signal, a comparator for comparing said image signal with a predetermined reference, and a controller for controlling the image signal in accordance with an output of the comparator to maintain a level or again of the image signal at a constant level.

10 Claims, 34 Drawing Sheets

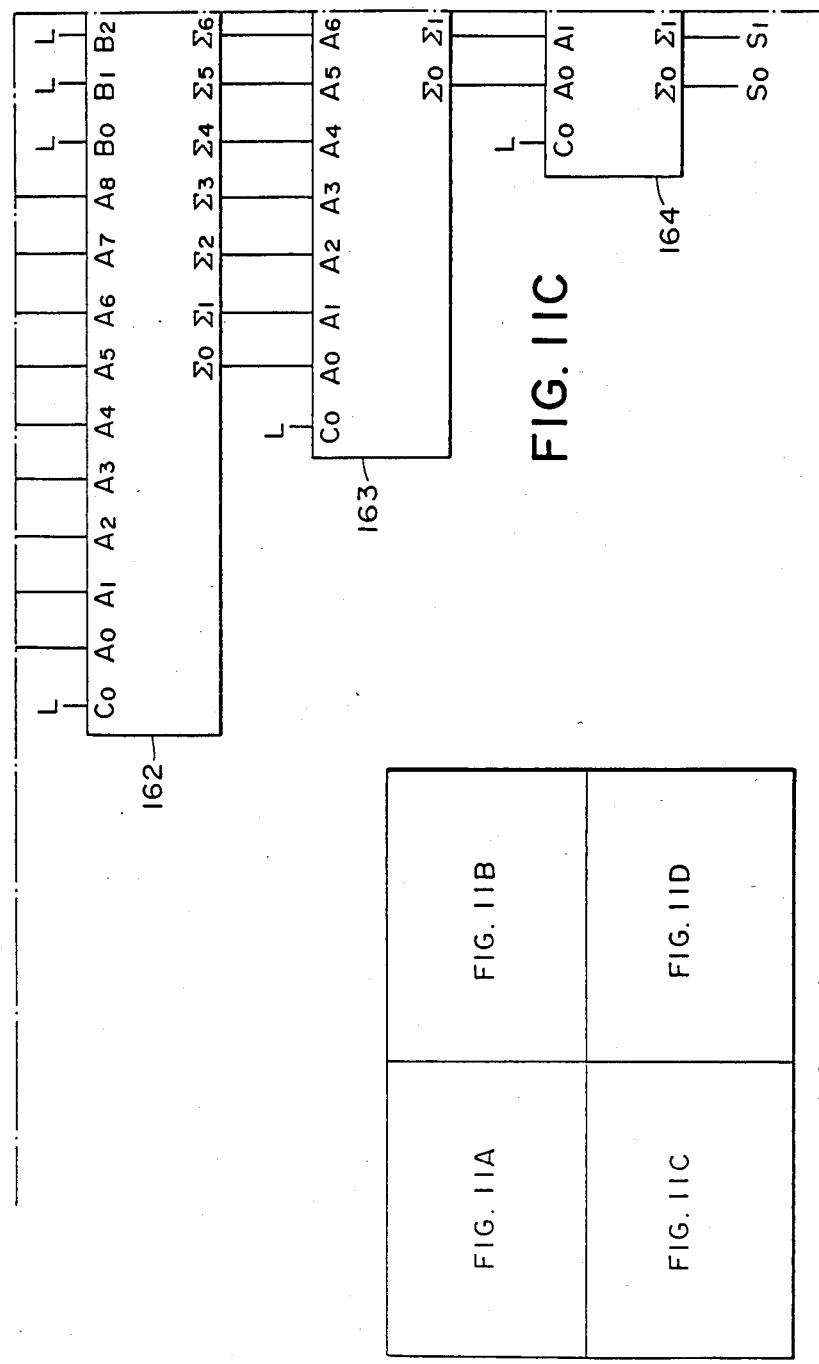

$A = 2(M+N)$

PRE PROCESSION

PAST PROCESSION

IMAGE PROCESSING APPARATUS

This is a division of application Ser. No. 326,269, filed Dec. 1, 1981, now U.S. Pat. No. 4,589,034.

BACKGROUND OF THE INVENTION

1. Field of the Invention

The present invention relates to an image signal processing apparatus for processing an output image signal of an image scanner which electrically scans a text image.

2. Description of the Prior Art

When a density of a text image is electrically picked up by a solid-state image pickup device such as a charge coupled device (CCD) and the electric signal is transmitted in the form of a black-white binary signal for printing, the quality of a reproduced image is poor because of the affect of shading included in the image pickup device and any optical system. When the image is picked up by the solid-state image pickup device such as a CCD, an output image signal waveform from the solid-state image pickup device is not necessarily flat even if the test image is entirely white. This phenomenon is called shading. One of major causes of the shading is that the transfer efficiency of each of the cells of the solid-state image pickup device such as a CCD is not 100%. Other causes of the shading are manufacturing variance of the solid-stage image pickup device such as a CCD, distortion at a periphery of an optical lens inserted between the text and the CCD and nonuniformity of a light source for illuminating the text.

In order to resolve the above problem, approaches have been proposed in Japanese Published Unexamined Patent Application Nos. 53-139421 and 53-21219 in which the shading is reduced by a relatively simple circuit including a low-pass filter and a delay line. However, this method is not applicable when a half-tone is to be reproduced using a systematic dizzer method. Furthermore, high fidelity reproduction and high quality of print cannot be expected unless the level, the gain and the linearity of the image signal are exactly matched to those of the original text.

On contrary, if the high fidelity reproduction is attained, a desired image may not be sharp because a background of the text is reproduced.

In addition, noise generated during the processing of the image signal or noise images such as smears in the background may be reproduced or emphasized resulting in the degradation of the quality of the reproduced image.

A process for emphasizing an outline of the read image is known. When this process is used, small noise in the background or noise generated in the processing circuit is emphasized resulting in a poor quality of the reproduced image.

When a line scan type photoelectric image pickup device which reads the text in a main scan direction is used and the image pickup device or an optical system is mechanically moved in a sub-scan direction relative to the text to scan the entire image on the text, if the outline emphasis process is carried out in both the main scan direction and the sub-scan direction, the image reproduced from the image signal read from the 90-degree rotated text and the image produced from the image signal read from the non-rotated text are different because of a difference between the resolving power in the main scan direction and the resolving power in the sub-scan direction.

When a plurality of CCD's are arranged serially along the line to read a wide width text, the characteristics of the processing circuits must be matched to the characteristics of the respective CCD's.

On the other hand, when the image signal is converted to a digital signal, is processed for the outline emphasis, the outline emphasis circuit for the outline emphasis process needs a large number of components. When such outline emphasis circuits are used, one for each of the image pickup devices, the cost is increased and the size of the apparatus is increased.

When the text image is read by the image pickup device such as a CCD through an optical system to produce the image signal, an MTF of a lens of the optical system and a spatial frequency characteristic of the CCD including the lens are not constant. For example, CCD image pickup devices have large manufacturing variance and do not have a constant spatial frequency characteristic. When the light quantity is to be controlled by an iris, the MTF is lowered as the aperture of the iris increases.

SUMMARY OF THE INVENTION

It is an object of the present invention to provide an image processing apparatus which is free from the disadvantages described above.

It is another object of the present invention to provide an image processing apparatus capable of reproducing a high quality of image.

It is another object of the present invention to provide an image processing apparatus which can reproduce an image of an original text with a high fidelity.

It is another object of the present invention to provide an image processing apparatus which can control a level or gain of an image signal at a precision of a least significant bit (LSB) of an A-D converter.

It is another object of the present invention to provide an image processing apparatus which can reproduce an image while modifying an unsharp image caused by background color of the text.

It is another object of the present invention to provide an improved image processing apparatus which can eliminate noise images such as smears in background and noise generated during the processing of the image signal.

It is another object of the present invention to provide an image processing apparatus which can emphasize an image outline without emphasizing the noise image.

It is another object of the present invention to provide an image processing apparatus which can give optimum defocusing correction in both a main scan direction and a sub-scan direction.

It is another object of the present invention to provide an image processing apparatus which can give appropriate shading correction to the half-tone reproduction.

It is another object of the present invention to provide an image processing apparatus which can prevent the degradation of the quality of a reproduced image when a text is ready by a plurality of read devices.

It is another object of the present invention to provide an image processing apparatus for processing image data read from a text by a time sharing technique.

It is another object of the present invention to provide an image processing apparatus which processes image signals read by a plurality of read devices by a single outline emphasis circuit.

It is another object of the present invention to provide an image processing apparatus which prevents the degradation of the quality of reproduced image due to a spatial frequency characteristic of an image signal.

The above and other objects of the present invention will be apparent from the following description of the preferred embodiments of the present invention.

DETAILED DESCRIPTION OF THE PREFERRED EMBODIMENTS

The embodiments of the present invention will now be explained with reference to the accompanying drawings.

Figure 1:
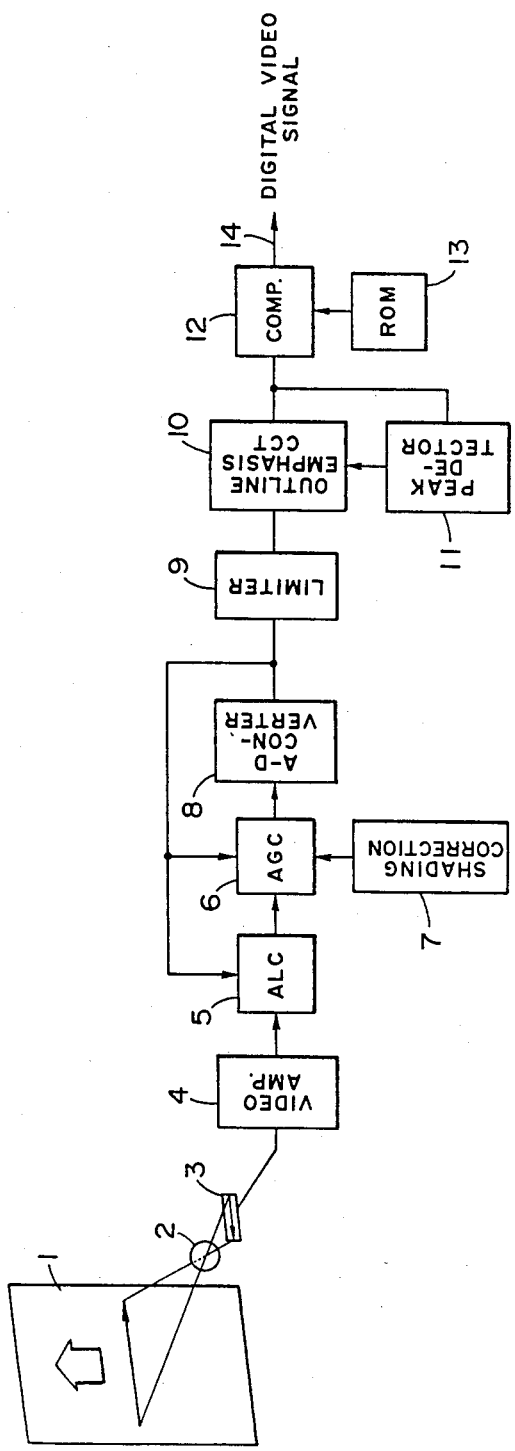
FIG. 1 is a block diagram of an automatic equalizer for a video signal.
Figure 26:
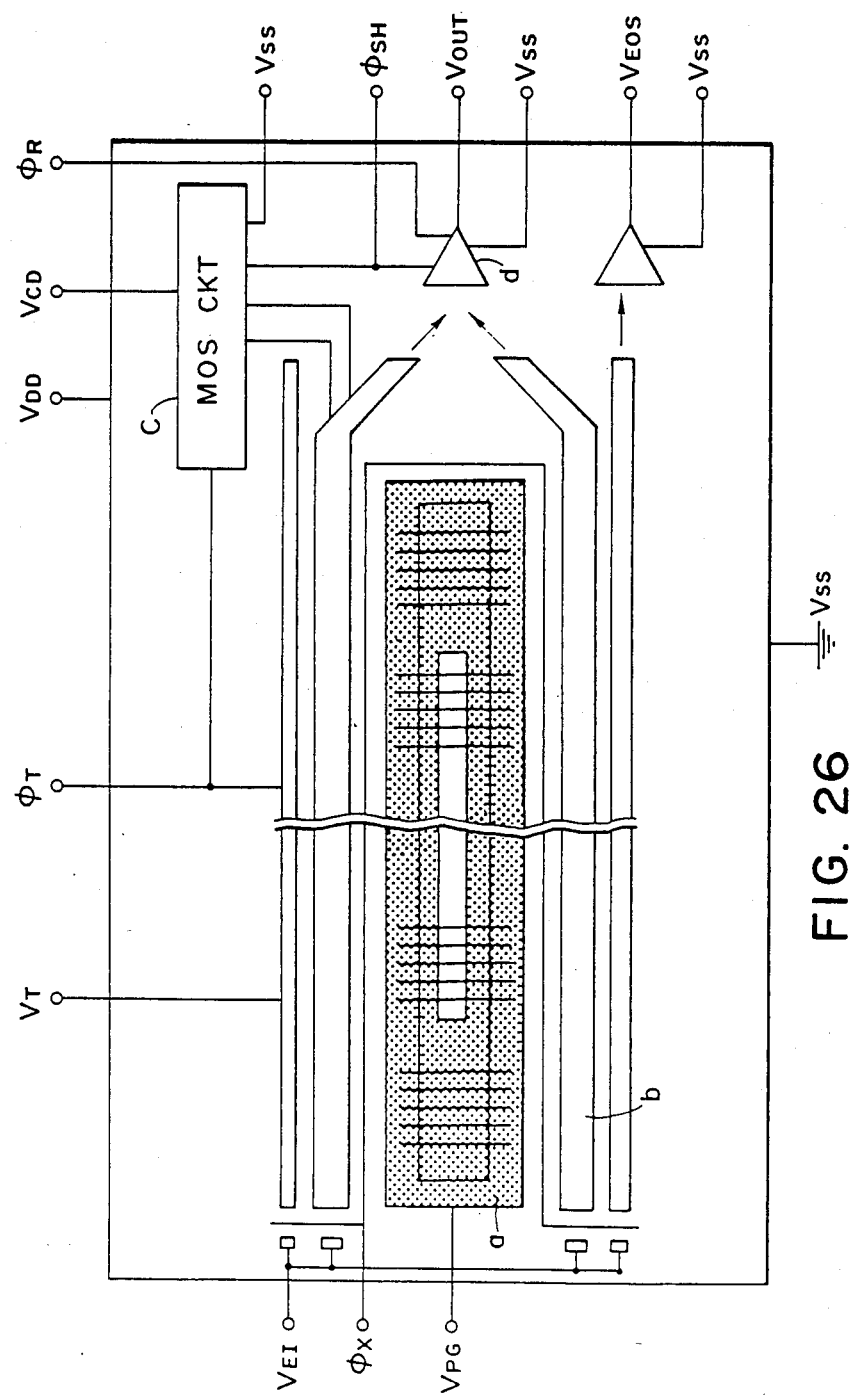
FIG. 26 is a plan view of the CCD.

FIG. 1 is a basic block diagram of one embodiment of an image signal processing apparatus of the present invention. Numeral 1 denotes a text which is transported by a mechanical transport unit (not shown) in the direction of an arrow. Numeral 2 denotes a lens for focusing a text image to a CCD. Numeral 3 denotes a line CCD image pickup device as shown in FIG. 26. Any other image pickup means may be used so long as it can read a density of the text 1 and produce an image signal (video signal). For example, it may be a MOS photosensor. Instead of transporting the text 1, the lens 2 and the CCD 3 may be sub-scanned. Numeral 4 denotes a video amplifier which DC-amplifies an output voltage from the CCD 3 to a desired level. If an AC amplifier is substituted, a sufficient clamping circuit is required. Numeral 5 denotes an automatic level control (ALC) circuit which clamps a black level of a video signal to a fixed potential, e.g. zero volt. Accordingly, the video amplifier 4 may be an AC amplifier as noted. Numeral 6 denotes an automatic gain control (AGC) circuit which compensates for a change in light quantity of a light source (not shown) for illuminating the text, a change in the aperture of an iris of the lens 2 and a variance in the sensitivity of the CCD 3 to produce the video signal having a constant maximum amplitude. Numeral 7 denotes a shading correction circuit which compensates for nonuniformity of light quantity of the light source, a peripheral light quantity characteristic of the lens 2 such as a $COS^4\theta$ characteristic and the variance of the sensitivity of the CCD 3. The shading correction circuit 7 may be that disclosed in Japanese Patent Application No. 54-140787 filed by the assignee of the present invention.

Numeral 8 denotes an A–D converter in which an analog video signal is sampled by a clock pulse $\phi_T$, not shown, and converted to a digital signal. A sampling level is selected to be higher than the depth of scales required. For example, 6-bit 64-scale may be selected.

Figure 14:
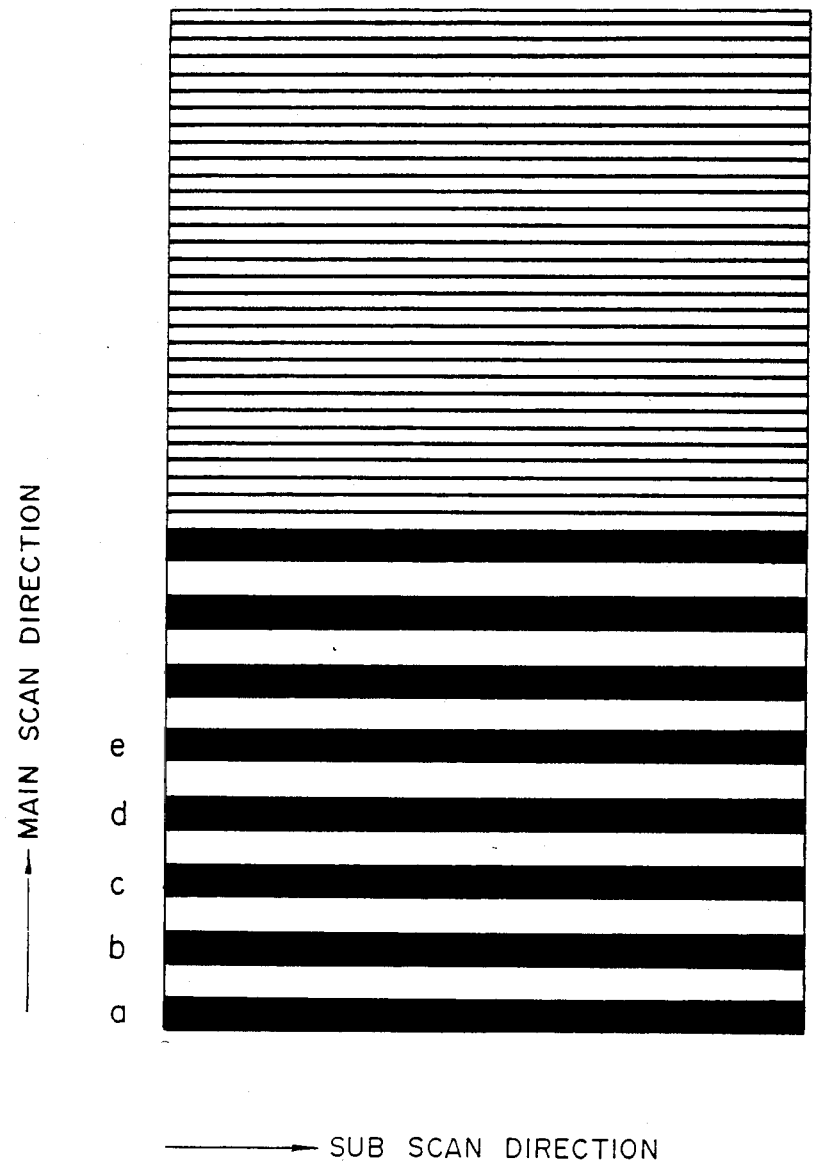
FIG. 14 is a plan view of a test chart.

Numeral 9 denotes a limiter circuit which functions to eliminate small noise in white and black areas of the image. Numeral 10 denotes a digital filter (outline emphasis circuit) which carries out the outline emphasis process to the digital image signal. Numeral 11 denotes a peak detector which determines the amount of correction by the outline emphasis circuit 10 such that the outline is equally emphasized dependently of the main scan direction, the sub-scan direction and the spatial frequency characteristic. The peak detector 11 and the outline emphasis circuit 10 form an equalizer circuit for compensating for the MTF characteristic of the lens 2 and the frequency characteristic of the CCD 3. The term frequency herein used means a spatial frequency which represents a period of black-white arrangement. Examples of high frequency and low frequency are shown in FIG. 14. For example, if five black stripes are included in 1 mm (5 lp/mm), the spatial frequency is 10 pels. Numeral 12 denotes a magnitude comparator and numeral 13 denotes a read-only memory (ROM) for a dizzer matrix. The compensated digital video signal and the dizzer matrix data stored in the ROM 13 are compared by the comparator 12 and a 1-bit (1-line) digital video signal is produced at an output terminal 14. The digital video signal output terminal 14 is connected to a printer, not shown, through a modulator (not shown) or directly to reproduce the image.

Figure 2:
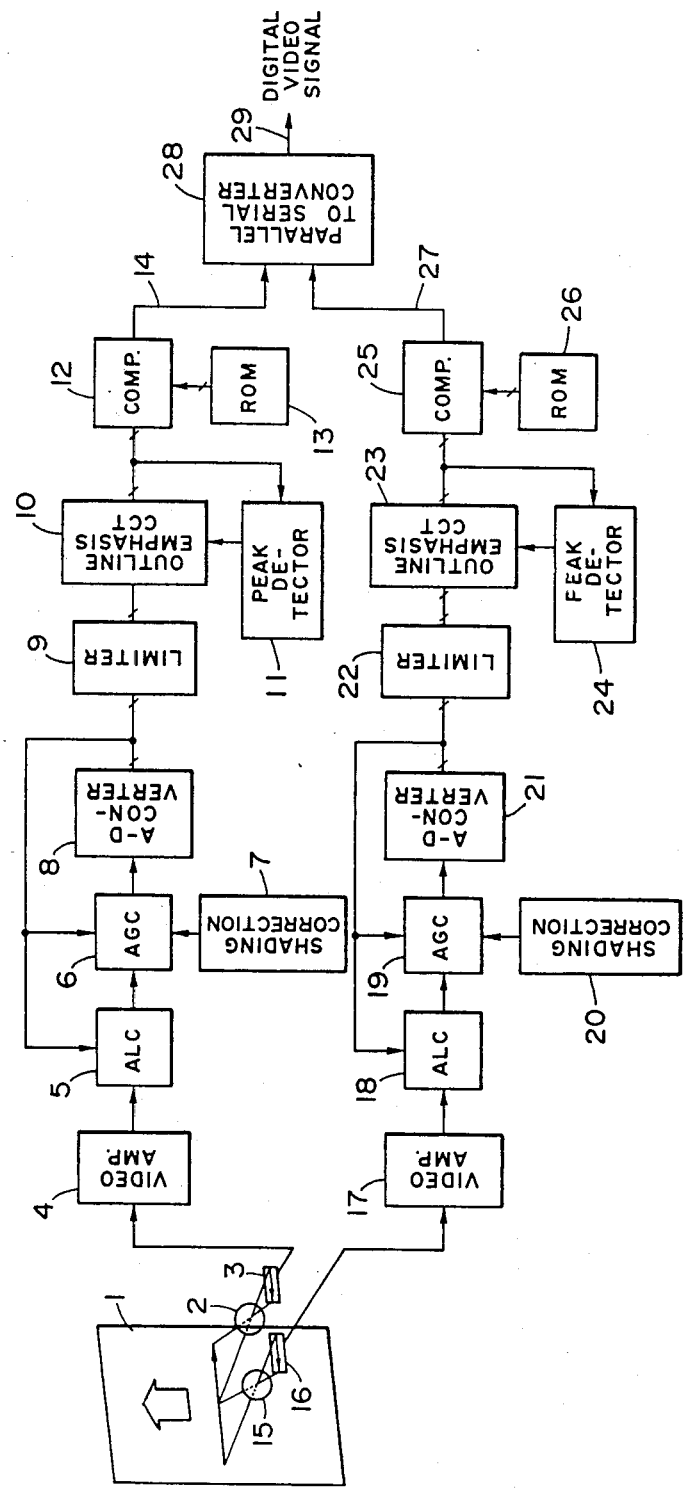
FIG. 2 is a block diagram of an embodiment of the present invention in which two CCD's are used.

FIG. 2 is a basic block diagram of one embodiment of the image signal processing apparatus of the present invention in which two CCD imaging devices are used.

Figure 3:
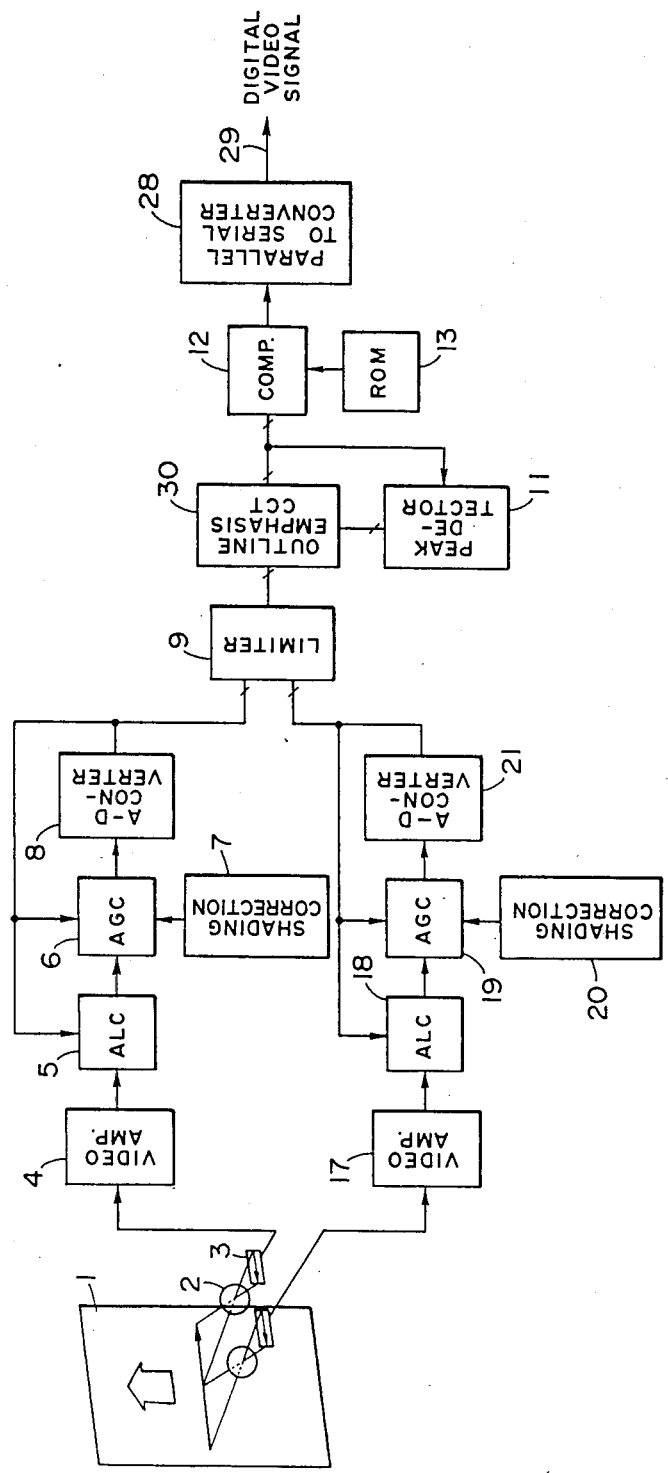
FIG. 3 is a block diagram of an embodiment in which an outline emphasis circuit is used in a time shared fashion, FIGS. 4A and 4B, assembled as shown in FIG. 4, illustrate an automatic level control circuit, FIGS. 5A and 5B, assembled as shown in FIG. 5, illustrate an automatic gain control circuit, FIGS. 6A and 6B, assembled as shown in FIG. 6, illustrate a limiter circuit.

As the size of the text to be read is increased, a larger CCD is required. In actuality, however, a large CCD is difficult to manufacture because of problems in manufacturing of a silicon device, and even if it can be manufactured, it will be very expensive. Accordingly, a plurality of CCD's are usually used to read the large size text. In FIG. 2, two auto-equalizers for the video signal in the reproduction frequency range shown in FIG. 1 are provided and a parallel-to-serial converter 28 finally produces a continuous digital video signal 29. However it is economically disadvantageous to provide two channels of video signal processing circuitry. FIG. 3 shows an embodiment in which the outline emphasis circuits 10 and 23 of the FIG. 2 embodiment, which are most complex in circuit configuration and of large size, are implemented by a single outline emphasis circuit 30 which is controlled in a time shared fashion. Since the ALC's, AGC's and the A-D converters are separately provided for the respective CCD's, the variance in the CCD's can be compensated.

Referring to FIGS. 2 and 3, numeral 15 denotes a lens, 16 denotes a CCD, 17 denotes a video amplifier, 18 denotes an automatic level control (ALC) circuit, 19 denotes an automatic gain control (AGC) circuit, 20 denotes a shading correction circuit, 21 denotes an A-D converter, 22 denotes a limiter circuit, 23 and 30 denote digital filters, 24 denotes a peak detector, 25 denotes a magnitude comparator and 26 denotes a ROM for a dizzer matrix. They have similar functions of the lens 2, CCD 3, video amplifier 4, ALC 5, AGC 6, shading correction circuit 7, A-D converter 8, limiter circuit 9, outline emphasis circuit 10, peak detector 11, magnitude comparator 12 and dizzer matrix ROM 13 respectively of the FIG. 1 embodiment. Numerals 27 and 29 denote video signal output terminals and numeral 28 denotes a parallel-to-serial converter.

The details of the circuits of FIGS. 1 to 3 are explained below.

(1) Automatic Level Control (ALC) Circuit

Figure 4:
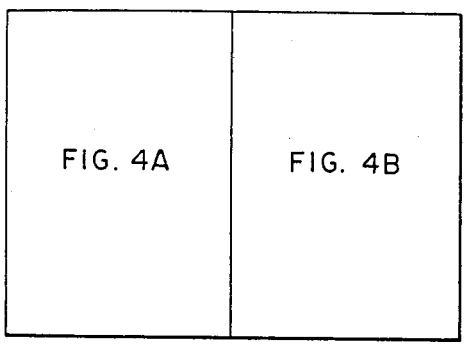
Figure 5:
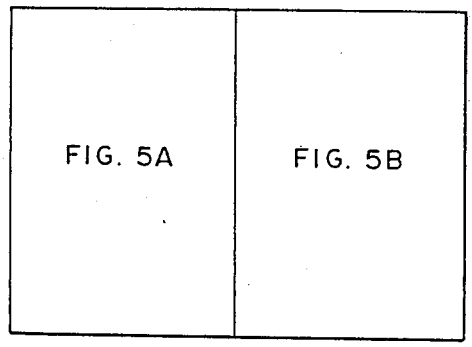
Figure 6:
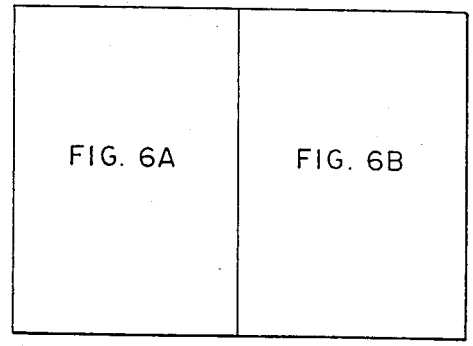
Figure 4A:
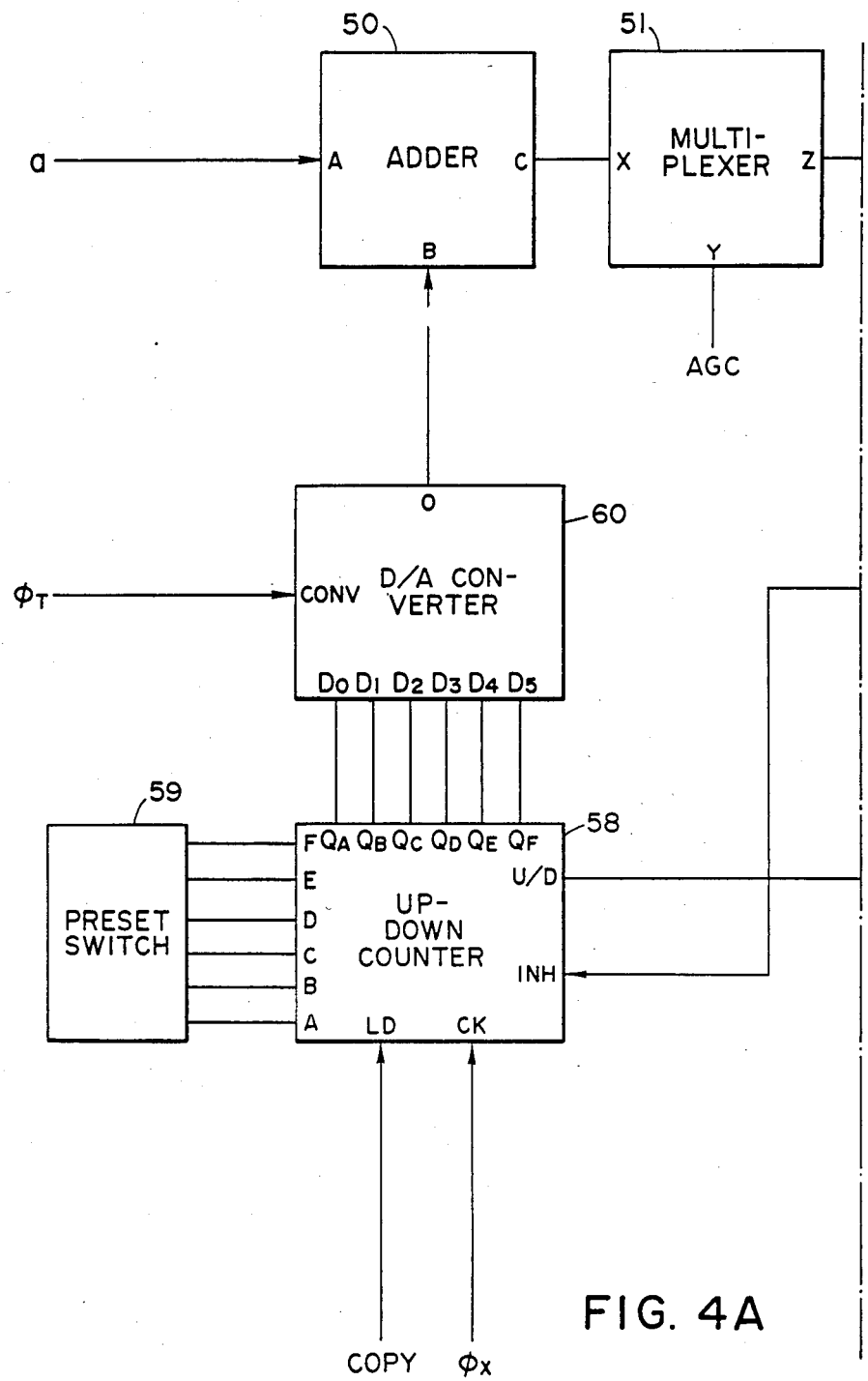
Figure 4B:
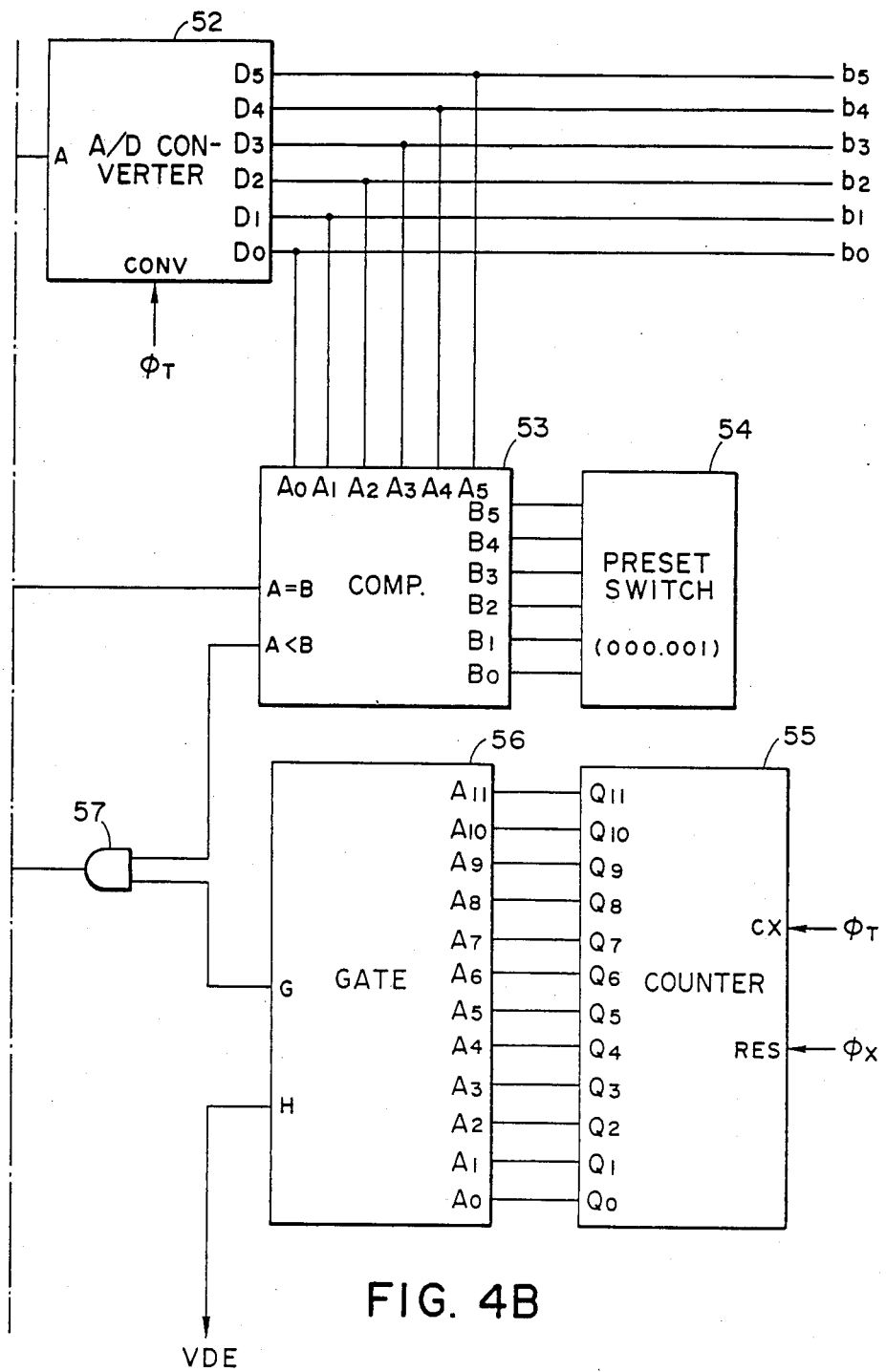

FIGS. 4A and 4B are a block diagram of one embodiment of the ALC circuit of the present invention. In the present embodiment, a particular black signal from the CCD is stabilized and clamped to a certain level and an entire level is shifted.

A symbol a denotes an input terminal, bn (n=0, 1, 2, ...) denotes an output terminal, 51 denotes an adder, 51 denotes a multiplier and 52 denotes an A-D converter which samples the analog signal thereto by a clock $\phi_T$. The multiplier 51 is not necessary for the ALC circuit, but when the ALC circuit is combined with the AGC circuit, the multiplier 51 must be inserted in the illustrated stage. The adder 50 produces an output representing C=A+B. The analog video signal processed by the adder 50 and the multiplier 51 is quantitized by the A-D converter 52 to, for example, a six-bit digital signal, which is supplied to the magnitude comparator 53 in which it is compared with a data from a preset switch 54. The six-bit magnitude comparator can be readily constructed by cascade-connecting four-bit comparators. The preset switch 54 is preset to, for example, "000001". If the video signal is "000000", an output terminal A<B assumes a high level "H", and an output terminal A=B assumes a low level "L". If the video signal is "000001", the output terminal A<B assumes "L" and the output terminal A=B assumes "H". When the video signal is "000010" or larger, both output terminals assume "L". Numeral 55 denotes a counter which is reset by a read horizontal synchronizing signal $\phi_X$ of the CCD and counts up the pel signal transfer clock $\phi_T$ to produce an output at a terminal $\theta$n (n=0, 1, 2, ...). The number n of bits is selected to be sufficient to separate the image area of the CCD 3 from the non-image black level area. For example, when 12 bits are used, 4096 pels (one line of pels) can be addressed. The counter 55 may be constructed by cascade-connecting three four-bit synchronous counters. In the present embodiment, a reference black pulse BR-REF produced by the CCD as shown in FIG. 26 is used as the non-image black level.

Numeral 56 denotes a gate circuit which is a logic circuit to address a non-image area black level period in the video signal. It may comprise a multi-input AND circuit. Symbol G denotes an output terminal which is connected to AND gate 57 to gate the signal A<B during the black level period.

Numeral 58 denotes an up-down counter. Data preset in a preset switch 59 is loaded to the up-down counter by a vertical synchronizing signal COPY (which is generated immediately before the beginning of read operation of each text page), and the up-down counter 58 counts up (or down) the horizontal synchronizing signal $\phi_X$. Outputs QA-QF of the up-down counter are supplied to a D-A converter 60 where they are converted to an analog signal by the transfer clock $\phi_T$, which analog signal is applied to another input terminal B of the adder 50.

The level control is carried out in the following manner. At the beginning of the image read operation, the data in the preset switch 59 is loaded to the up-down counter 58 by the signal COPY. The loaded data is directly transferred to the D-A converter 60 which converts it to the analog signal. The analog signal and the video input signal are combined in the adder 50 and the resulting sum is converted to a digital signal by the A-D converter 52. If the black level is equal to or larger than "000010", the output A<B assumes the "L" and the up-down counter 58 operates in a count-down mode to count down to loaded data in synchronism with the horizontal synchronizing signal $\phi_X$. As a result, a D.C. level of the video signal applied to the input terminal of the A-D converter 52 is lowered for each line read scan of the CCD. When the output A=B assumes "H", that is, when the black level of the output signal of the A-D converter 52 is "000001", the input 1NH assumes an "H" and the up-down counter 58 stops to its count. Thus, the black level of the video signal is changed to "000001". If the black level of the output video signal of the A-D converter 52 becomes "000000", the output terminal A<B assumes "H" so that the up-down counter 58 operates in a count-up mode to raise the D.C. level of the video signal. As a result, the black level of the video signal is maintained at "000001". The setting of the preset switch 59 is selected such that when the preset value is D-A converted and the converted analog signal is added to the video signal and the resulting sum is A-D converted to produce the black level, the resulting black level is equal to or closest to the setting of the preset switch 54. The preset switches 54 and 54 can be advantageously constructed by hexadecimal coded switches.

Instead of the counter 58 and the D-A converter 60, an integrator for integrating the output of the comparator 53 may be used and the output of the integrator may be supplied to adder 50 to perform the ALC. Alternatively, a closed loop may be formed before the A/D converter.

Since the adder circuit forms a closed loop, the video digital value corresponding to the analog video signal of a predetermined level can be converged to the preset data value. The level control is performed at a precision of one bit of the video digital value.

The overall density of the reproduced image can be varied by changing the settings of the preset switches 54 and 59.

(2) Automatic Gain Control (AGC) Circuit

Figure 5A:
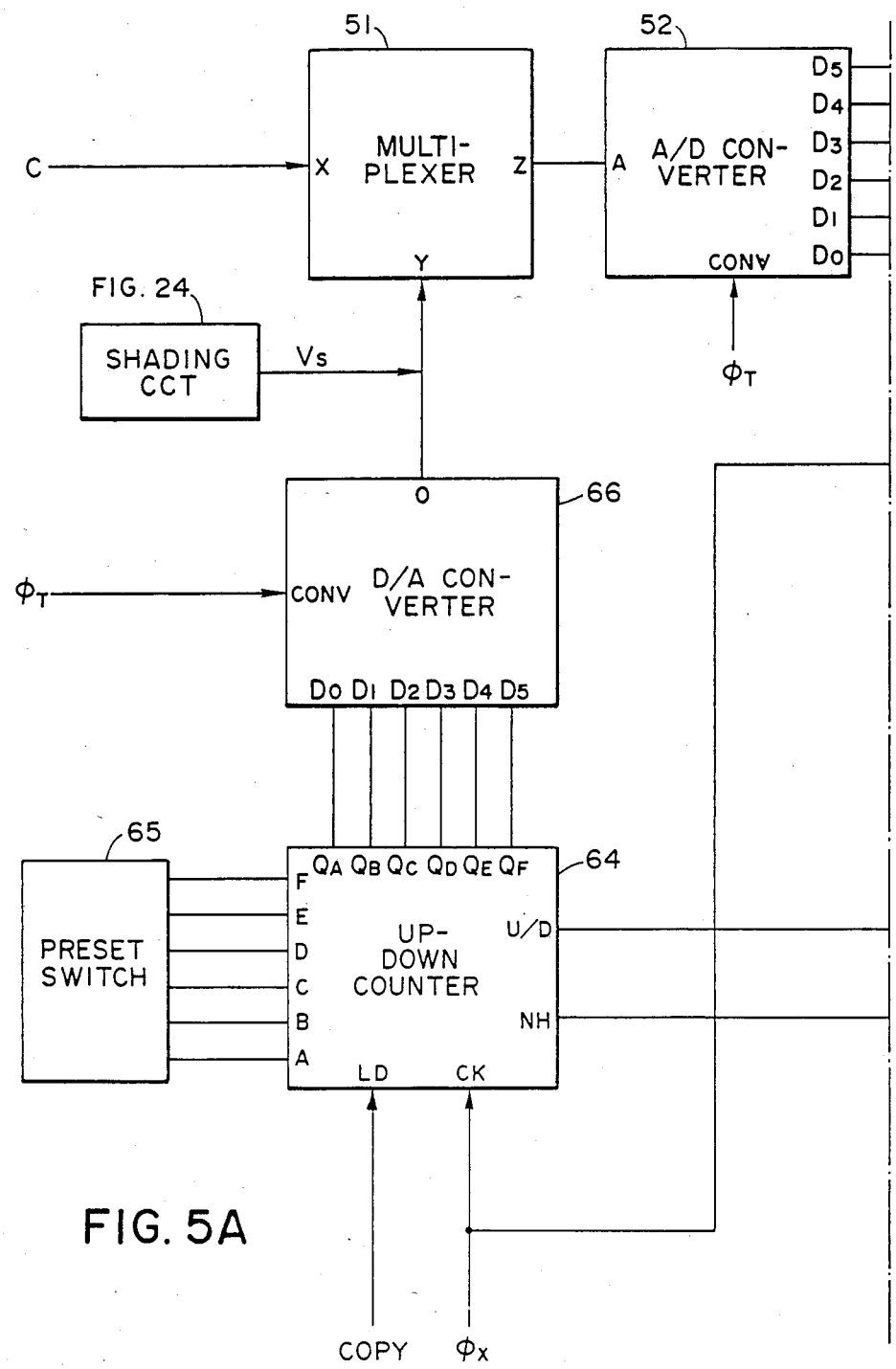
Figure 5B:
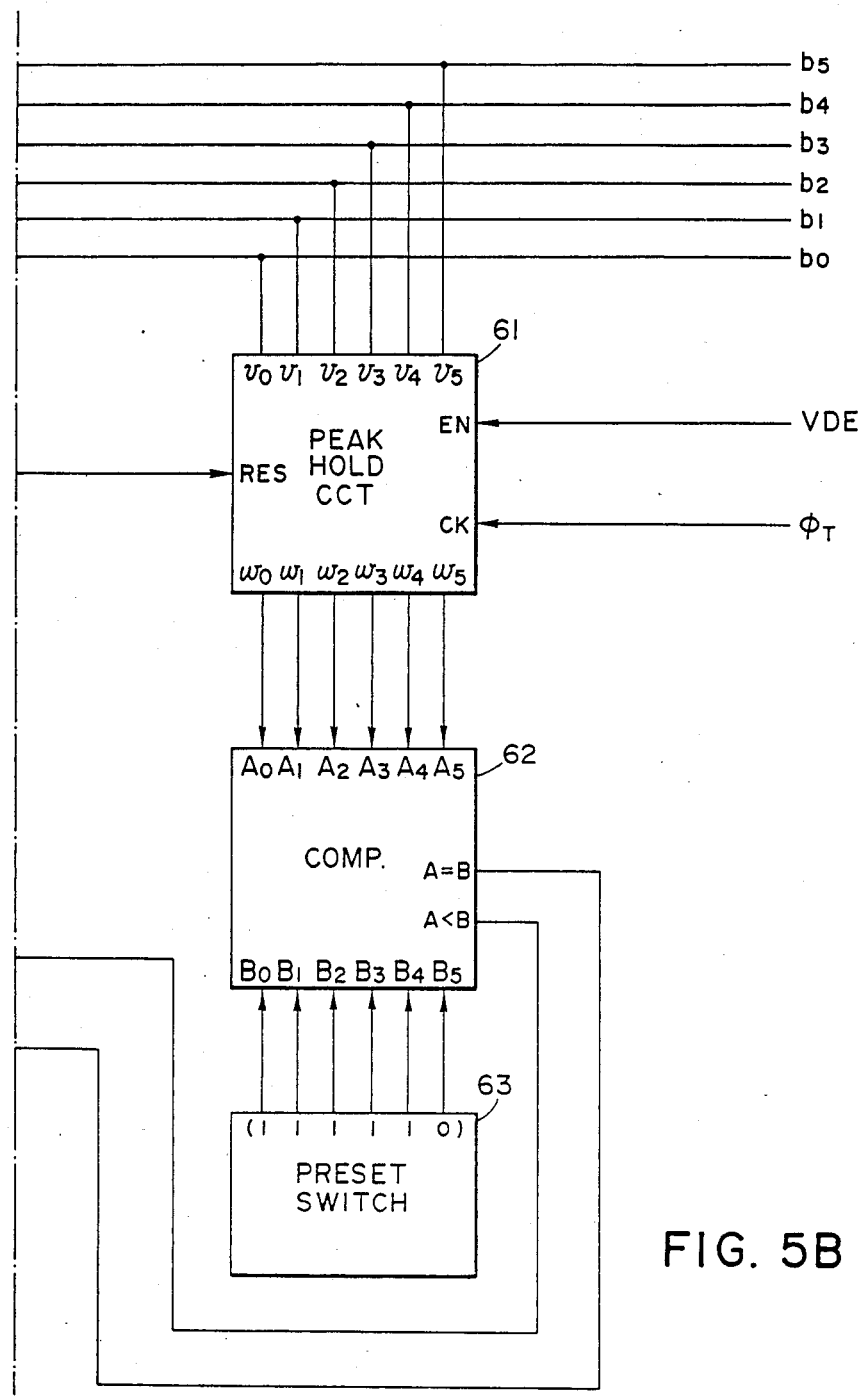

FIGS. 5A and 5B are shows a block diagram of one embodiment of the AGC circuit of the present invention.

Symbol C denotes an analog video input terminal and symbol bn (n=0, 1, 2, . . . ) denotes an output terminal. Numeral 51 denotes the analog multiplier having a function of $$X \cdot Y = Z \qquad (1)$$

Thus, an amplitude X of the video signal can be controlled by changing a D.C. level Y. Consequently, a difference between a maximum level and a minimum level (that is, gain or contrast) can be maintained constant.

The like numerals denote the like elements throughout the drawings. The video signal quantized by the A-D converter 52 is supplied to a peak hold circuit 61, a detail of which is shown in FIG. 18.

Figure 18:
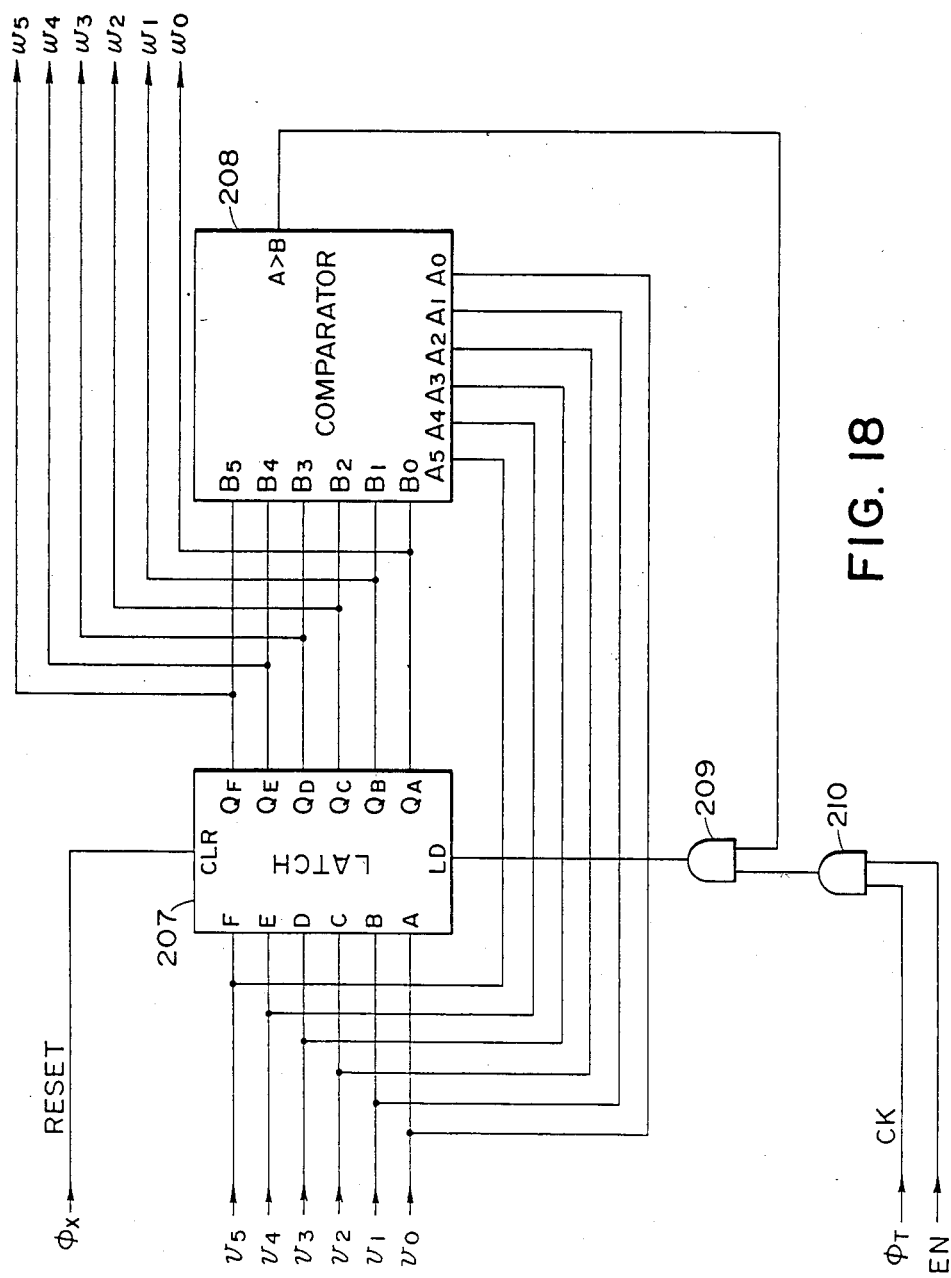
FIG. 18 shows a peak hold circuit.

Referring to FIG. 18, symbol Vn (n=0, 1, 2, . . . ) denotes an input signal and symbol Wn denotes a peak-held output signal. Numeral 207 denotes a latch circuit and numeral 208 denotes a magnitude comparator. Let us assume that a new input Vn is applied while latch outputs QA-QF hold a certain value. Those values are compared by the magnitude comparator 208. If the new input Vn is larger, an output AηB assumes "H", which conditions an AND gate 209.

On the other hand, the clock signal $\phi_T$ which passes through an AND gate 210 during the image area period passes through the AND gate 209 and it is applied to a load terminal LD of the latch circuit 207. As a result, the latch circuit 207 latches the new larger input data as a peak value. Since the latch circuit 207 is cleared by the horizontal synchronizing signal $\phi_X$, the data latched before clearing is the peak value of a preceding line.

The peak hold circuit is used in the present embodiment because the AGC is carried out based on the signal produced when the background (white area) of the text is read. If a standard white document is used, the peak hold circuit may be omitted.

Referring back to FIGS. 5A and 5B, the peak-held video signal is supplied to a magnitude comparator 62 where it is compared with a data preset in a preset switch 63. For example, a data "111110" is preset in the preset switch 63. Numeral 64 denotes an up-down counter, numeral 65 denotes a preset switch and numeral 66 denotes a D-A converter, all of which have the same functions as the corresponding ones shown in FIG. 4. The preset switch 65 determines the amplitude of the video signal and the preset switch 63 retains a white level peak value of the video signal to which the video signal is to be converged. If the white level peak value of the input video signal peak-held in the previous read cycle does not reach the setting "111110" of the preset switch 63, the up-down counter 64 is incremented by one to increase the gain of the multiplier 51, and if the white level peak value of the input video signal is larger than the setting of the preset switch 63, the gain of the multiplier is reduced. If the white level peak value of the input video signal is equal to the setting of the preset switch 63, the current gain of the multiplier 51 is held.

Instead of the counter 64 and the D-A converter 52, an integrator for integrating the output of the comparator 62 may be used and an output of the integrator may be supplied to the multiplier 51 to perform the AGC.

Since the multiplier circuit forms a closed loop, the video digital value converted from the input analog video signal of a predetermined level converges to the preset data value so that the input analog video signal can always be amplified in a stable manner.

The contrast of the reproduced image can be varied by changing the setting of the preset switch 63.

(3) Limiter Circuit

Figure 6A:
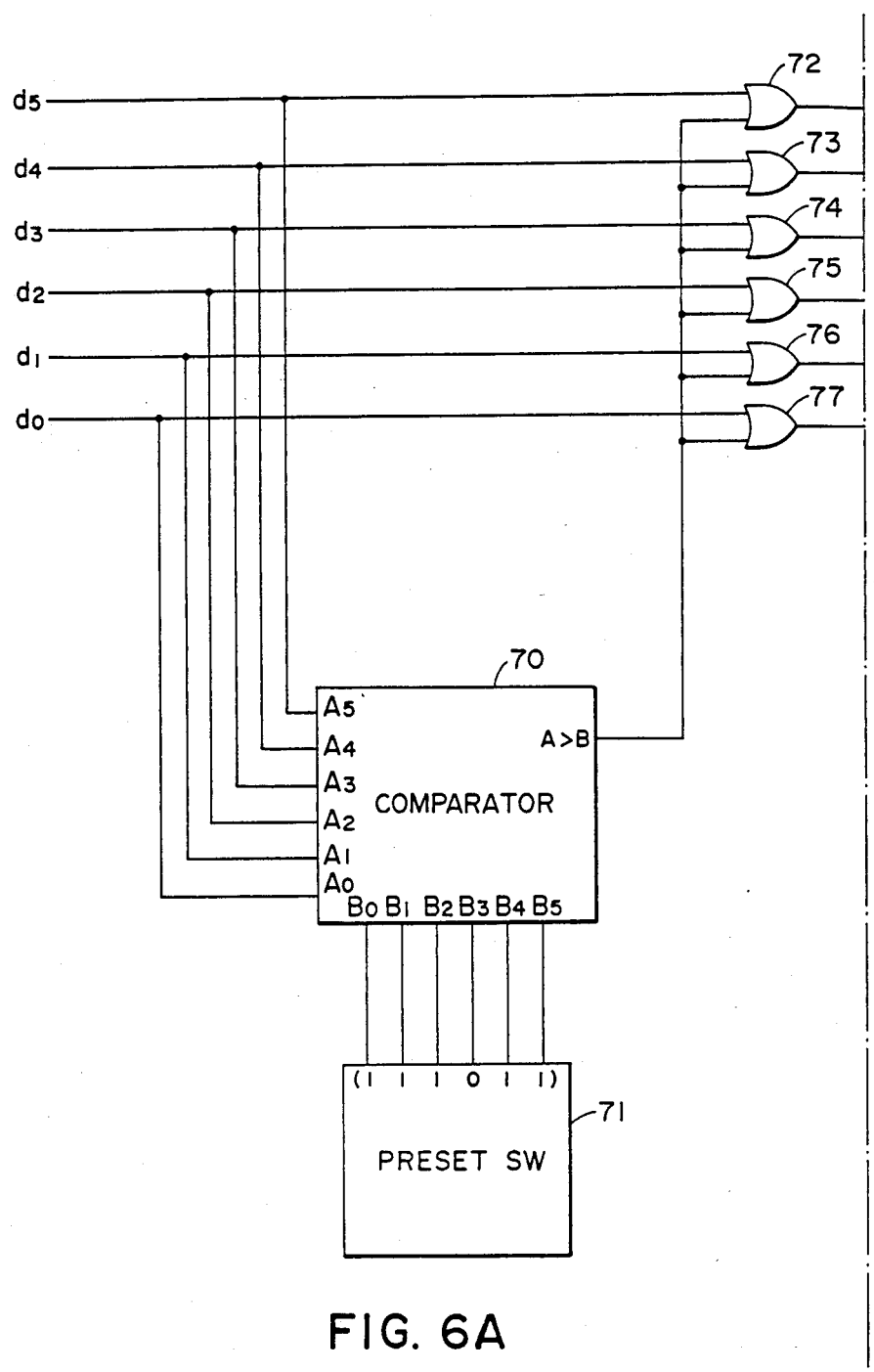
Figure 6B:
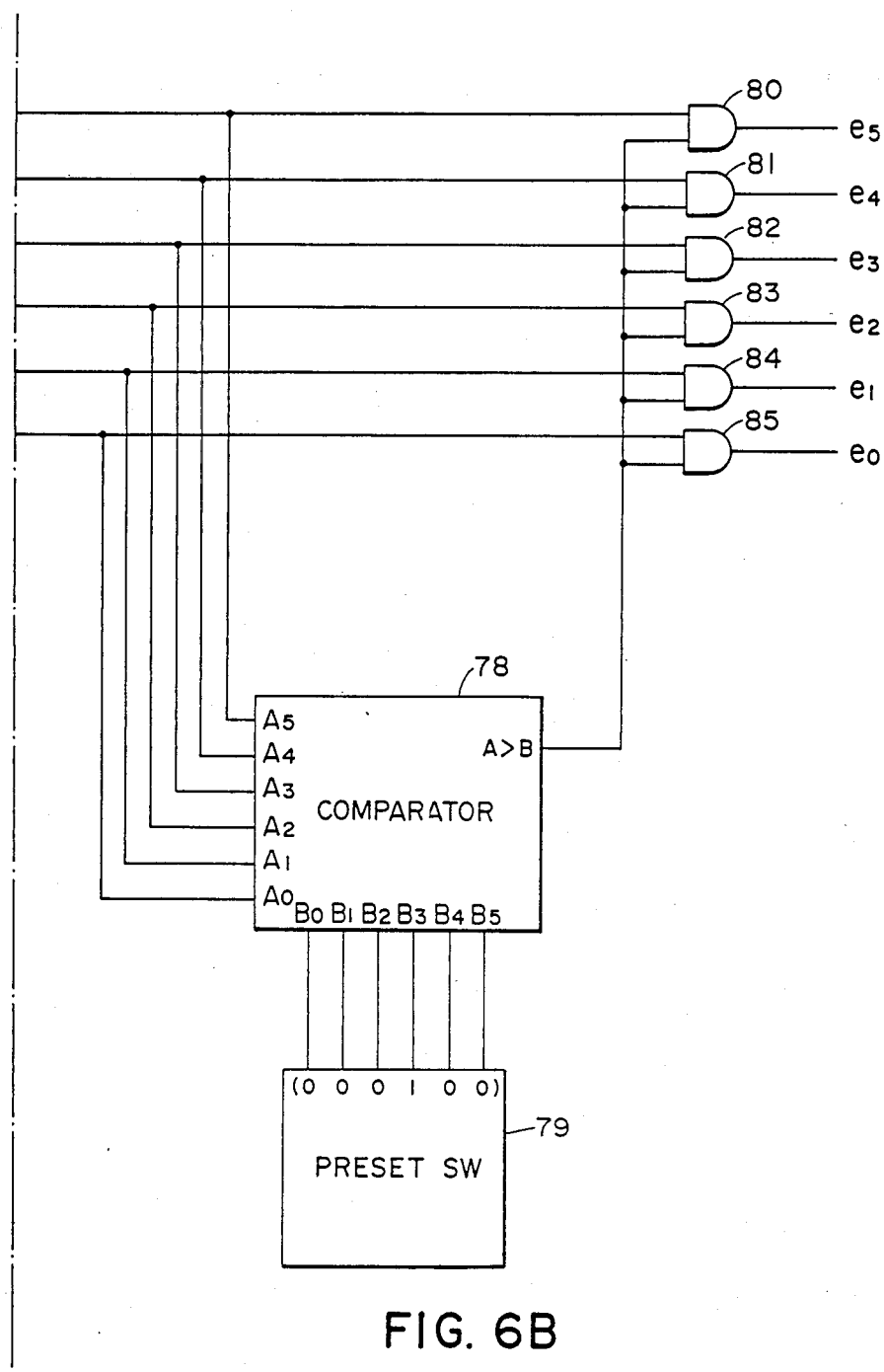

FIGS. 6A and 6B shows a block diagram of one embodiment of the limiter circuit 9 (FIG. 1) of the present invention.

Symbol dn (n=0, 1, 2, . . . ) denotes an input terminal and symbol en denotes an output terminal. Numeral 70 denotes a magnitude comparator, numeral 71 denotes a high (white) level limiting preset switch, numerals 72–77 denote OR circuits, numeral 78 denotes a magnitude comparator, numeral 79 denotes a low (black) level limiting preset switch and numerals 80–85 denote AND circuits.

Figure 19:
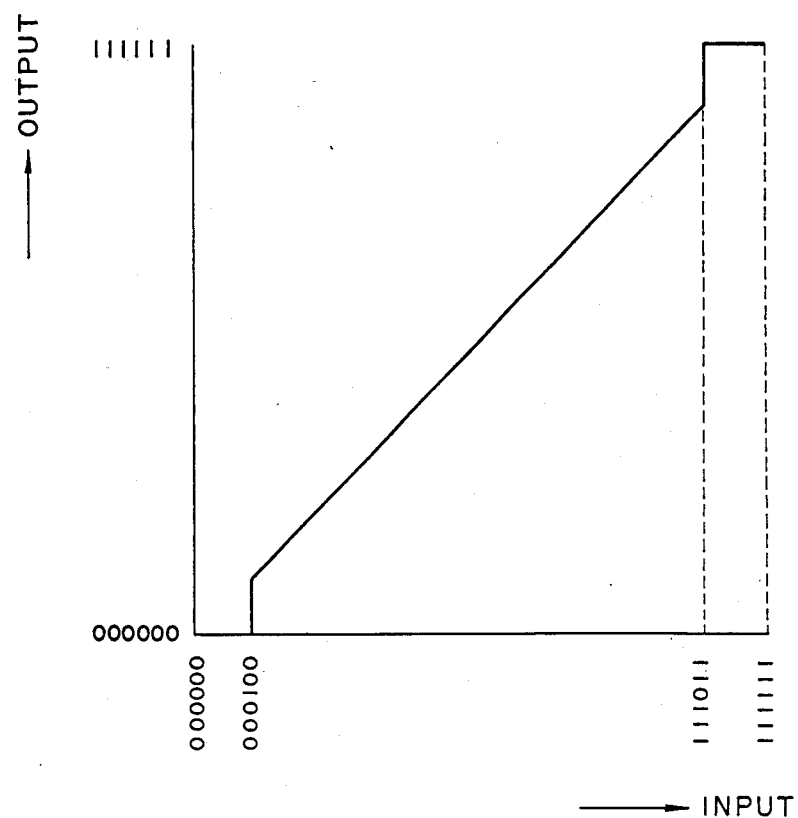
FIG. 19 shows an input-output characteristic chart of the limiter circuit, FIG. 20, comprising
Figure 20A:
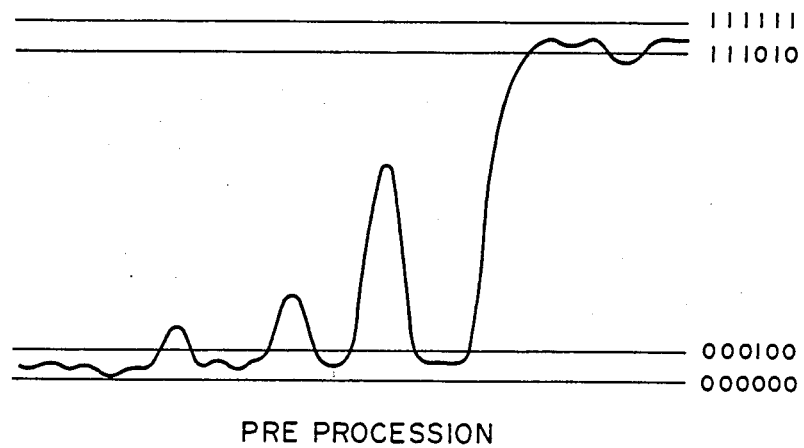
FIGS. 20A and 20B, shows input and output waveforms of the limiter circuit.
Figure 20B:
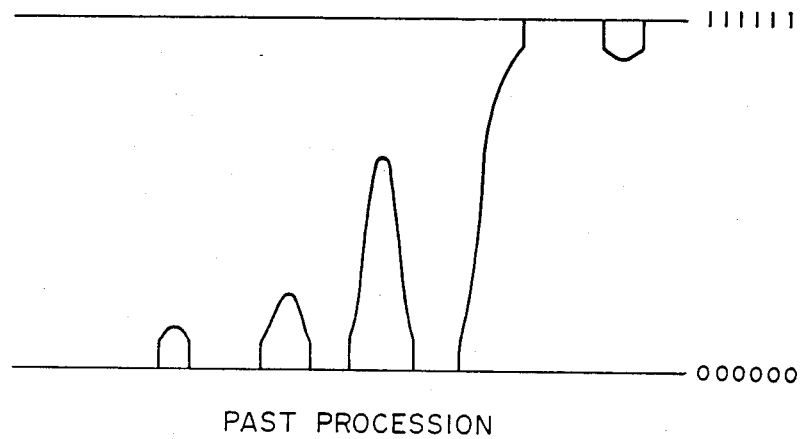

The preset switch 71 is preset to, for example, "111011". If an input signal is larger than the setting, an output terminal A>B of the magnitude comparator 70 assumes "H" and outputs of the OR gates 72–77 assume "111111". The preset switch 79 is preset, for example, to "000100". If the input signal is smaller than the setting, an output terminal A>B of the magnitude comparator 78 assumes "L" and outputs of the AND gate 80–85 assume "000000". An input-output characteristic of the present circuit is diagramatically shown in analog fashion in FIG. 19. Waveforms before and after processing by the limiter circuit are shown in FIGS. 20A and 20B, respectively. The waves are shown in analog fashion. By the provision of the limiter (filter), noise in the black and white areas of the image are eliminated, and low amplitude line portions of the noise-eliminated video signal can be modified to a waveform which is readily emphasized in the outline emphasis circuit which will be discussed later. Accordingly, when the limiter circuit is located in a preceding stage to the outline emphasis circuit, it offers an advantage.

According to the present embodiment, the analog video signal is converted to the multi-bit digital signal, and the digital signal smaller than a first predetermined digital value is brought to a minimum digital value and the digital signal larger than a second predetermined digital value is brought to a maximum digital value. As a result, the noise in the black and white areas of the image are eliminated, and the low amplitude line portions of the noise-eliminated video signal can be modified to a waveform which is readily emphasized in the outline emphasis circuit. The limiter may be used for only either one of the high level or the low level.

(4) Outline Emphasis Circuit (I)

Figure 7:
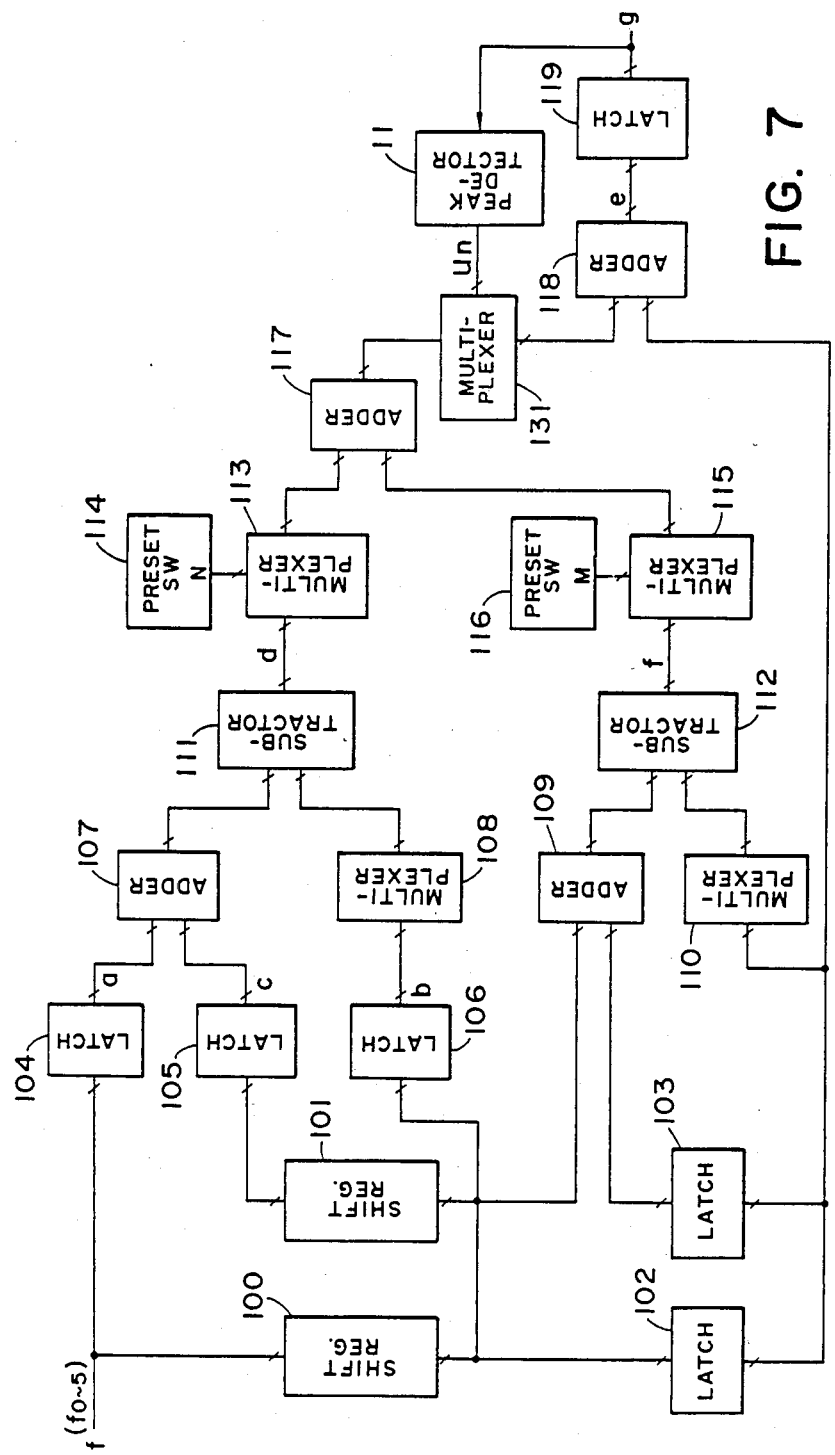
FIG. 7 shows an outline emphasis circuit for correcting defocusing.

FIG. 7 shows a block diagram of the outline emphasis circuit of the present invention. This circuit uses a transversal filter. It has been well known that the outline can be emphasized by subtracting Laplacian $$\nabla^2 f(x,y) = \frac{\partial^2 f}{\partial x^2} + \frac{\partial^2 f}{\partial y^2} \quad (2)$$

from an original video signal f(x,y). A deviation of the Laplacian for the digital image is given by $$\begin{aligned}\nabla^2 f(i,j) &= \Delta_x^2 f(i,j) + \Delta_y^2 f(i,j) \\ &= f(i+1,j) + f(i-1,j) + f(i,j+1) + \\ & \quad f(i,j-1) - 4 f(i,j)\end{aligned} \quad (3)$$

Figure 12A:
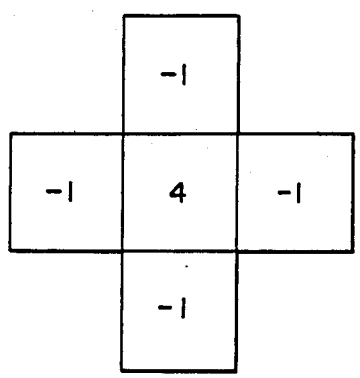
FIGS. 12A, 12B and 13 show Laplacian transformation.

FIG. 12A illustrates the operator of the equation (3) with i representing a main scan direction and j representing a subscan direction. "4" represents an emphasizing coefficient for a picture cell under consideration and "−1" represents that for surrounding picture cells. Signs are inverted. A negative Laplacian may be added to the original image. In the present example, a second order partial differentiation coefficient in the main scan direction and a second order partial differentiation coefficient in the sub-scan direction are equal.

However, when the operator is used as it is to emphasize the outline, the resolving power in the main scan direction and the resolving power in the sub-scan direction differ from each other. As a result, an image reproduced by reading a text rotated by 90 degrees and an image reproduced by reading a non-rotated text are different from each other. The inventors of the present invention investigated the reason therefor and found the following fact.

When an image is read by a one-dimension CCD imaging device as shown in FIG. 1, the main scan is electrically carried out by an internal register of the CCD but the sub-scan is carried out mechanically by moving the CCD along the text.

Figure 21:
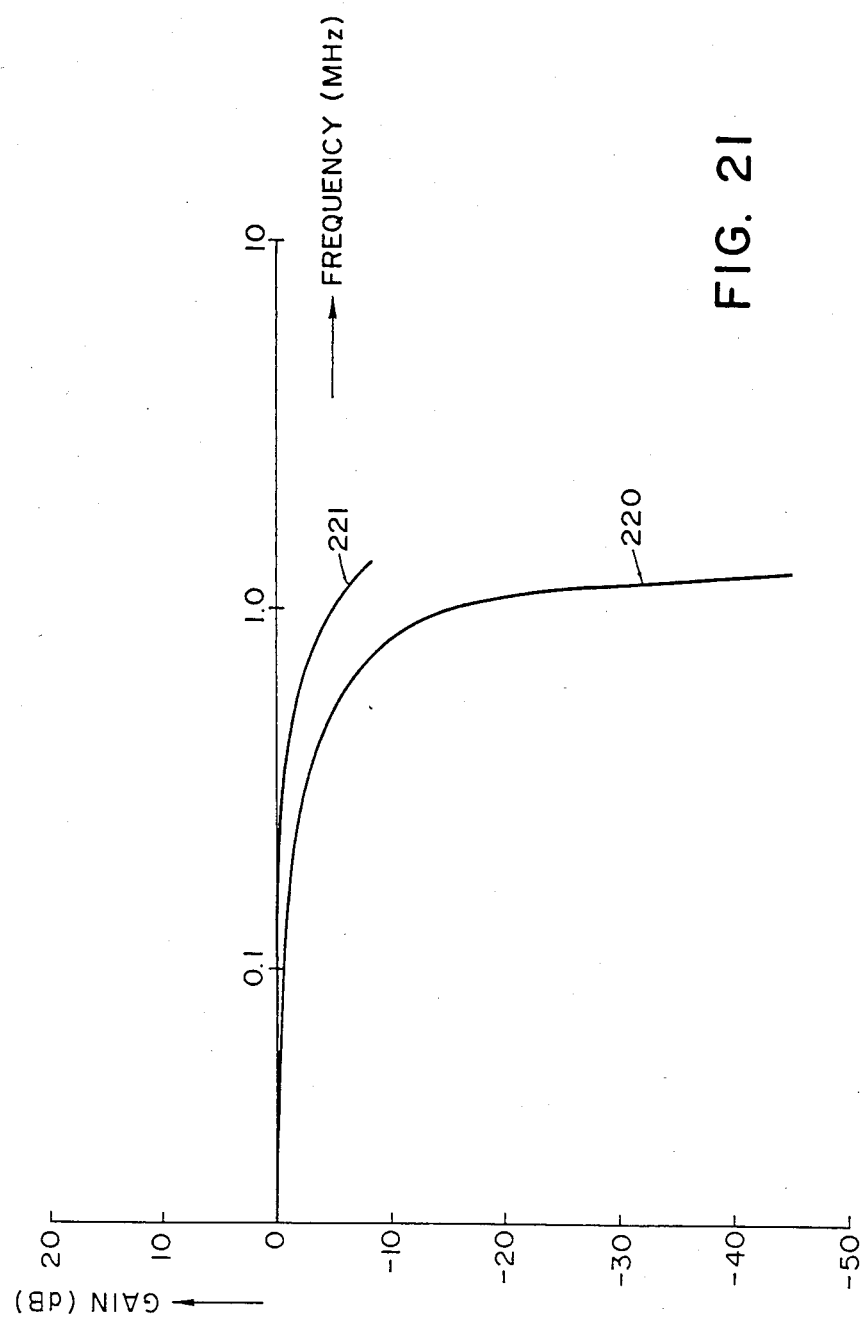
FIG. 21 shows frequency characteristics of a lens and a CCD.

A cause for lowering the resolving power in reading the text is the resolving power of the lens (MTF) in the sub-scan direction, but in the main scan direction the degradation of the resolving power due to the definiteness of a transfer efficiency of the CCD is further added. As a result, the resolving power in the main scan direction is lower than that in the sub-scan direction. As an example, FIG. 21 shows a spatial frequency characteristic 220 of the lens and the CCD, and a spatial frequency characteristic 221 of the lens. In the spatial frequency characteristic of the lens, the MTF of the lens is normalized by the frequency of the CCD transfer clock $\phi_T$.

Figure 12B:
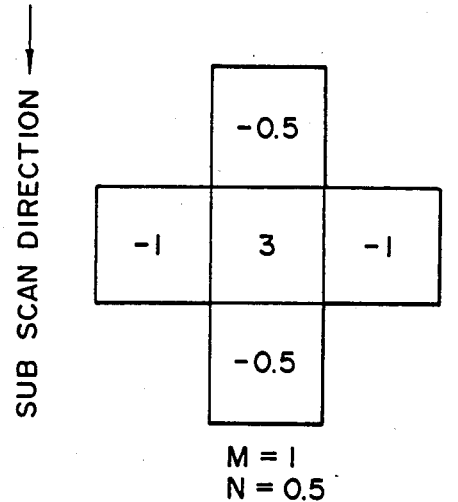
Figure 22:
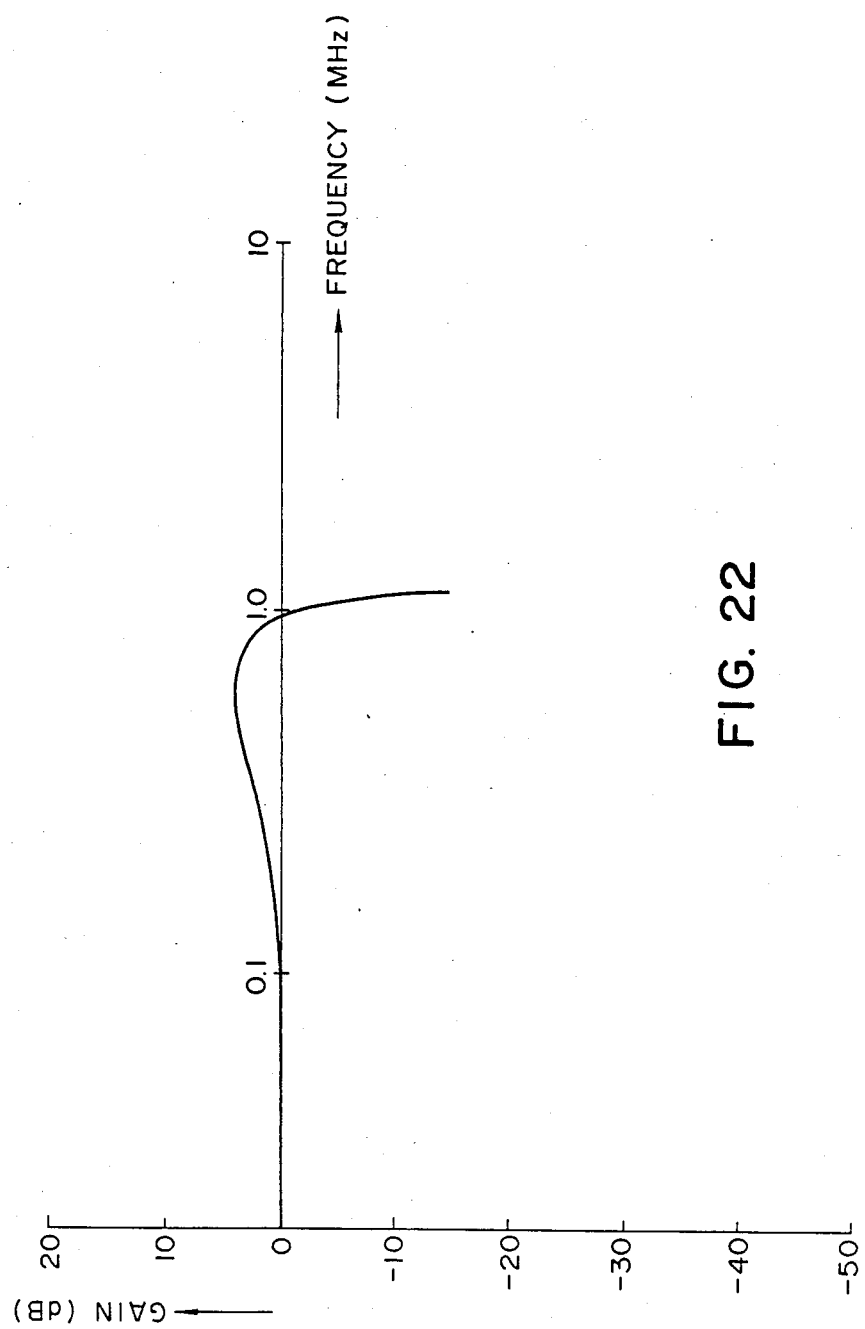
FIG. 22 shows an equalized frequency characteristic in a main-scan direction.
Figure 23:
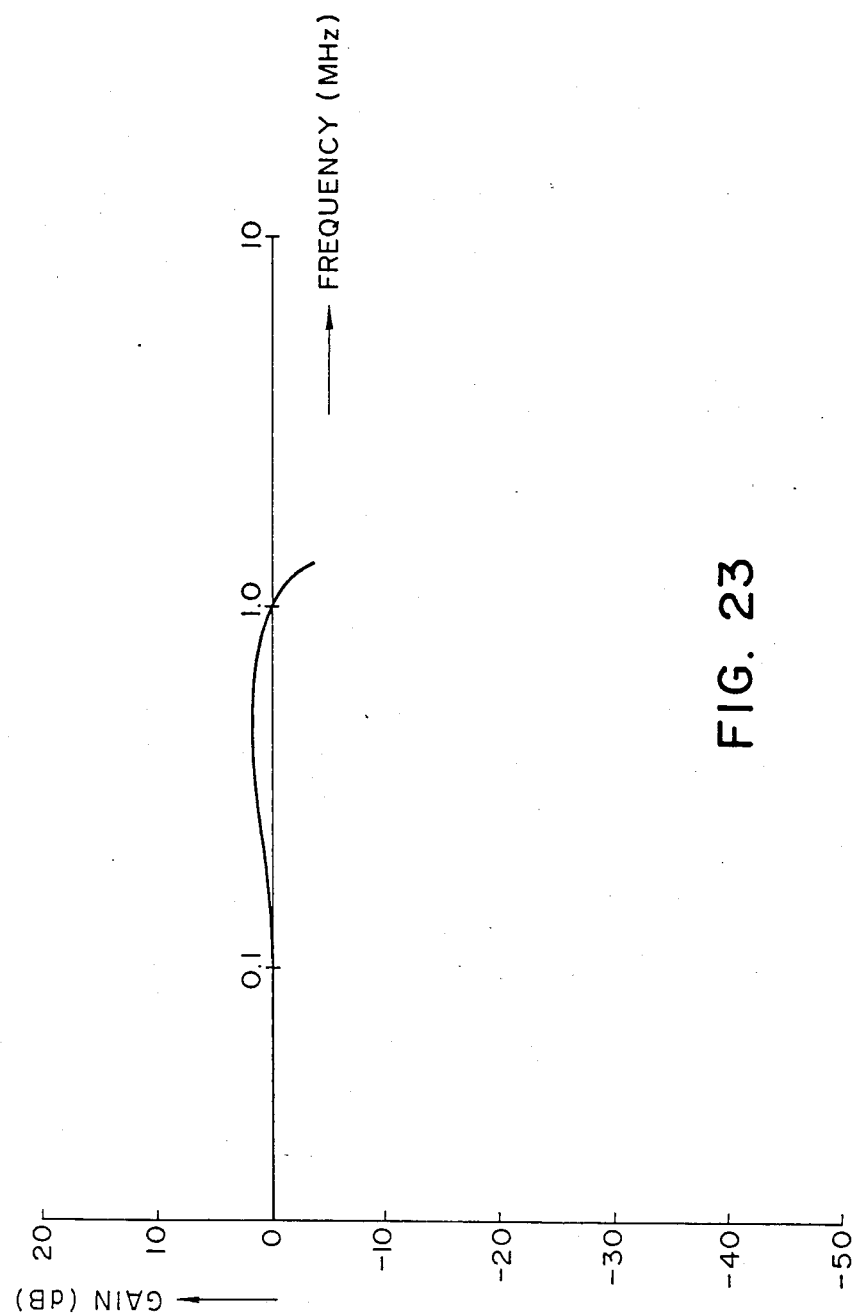
FIG. 23 shows an equalized frequency characteristic in a sub-scan direction.

As is seen from FIG. 21, the spatial frequency characteristic in the main scan direction is inferior to that in the sub-scan direction by a factor of two or more. Accordingly, the partial differentiation coefficient in the sub-scan direction is selected to be one half of the partial differentiation coefficient in the main scan direction, as shown in FIG. 12B. A frequency characteristics of a video signal derived by convoluting the operator of FIG. 12B with the image signal level in the main scan direction and the frequency characteristic 220 of the lens and the CCD shown in FIG. 21 are multiplied with each other to produce a frequency characteristic shown in FIG. 22. A frequency characteristic of a video signal derived by convoluting the operator of FIG. 12B in the sub-scan direction and the frequency characteristic 221 of the lens shown in FIG. 21 are multiplied with each other to produce a frequency characteristic shown in FIG. 23. FIG. 22 shows a composite frequency characteristic in the main scan direction and FIG. 23 shows a composite frequency characteristic in the sub-scan direction. When the operator of FIG. 12B is convoluted in the main scan direction, the operator in the sub-scan direction is neglected.

When an input waveform is a cosine wave cos (ωt), a frequency transfer function G (ω) in the main scan direction is given by $$G(\omega) = 3 - 2\cos(\omega\tau) \quad (4)$$

Similarly, a frequency transfer function H (ω) of the filter in the sub-scan direction is given by $$H(\omega) = 1.5 - \cos(\omega\tau) \quad (5)$$

where τ is a fixed delay time.

The above operation is carried out in the circuit shown in FIG. 7. Where the partial differentiation coefficient in the main scan direction is represented by M and the partial differentiation coefficient in the sub-scan direction is represented by N, the operation is expressed as shown below.

$$\begin{aligned}\nabla^2 f(i,j) &= M\Delta_x^2 f(i,j) + N\Delta_y^2 f(i,j) \\ &= Mf(i+1,j) + Mf(i-1,j) + \\ & \quad Nf(i,j+1) + Nf(i,j-1) - \\ & \quad 2(M+N)f(i,j)\end{aligned} \quad (6)$$

Figure 13:
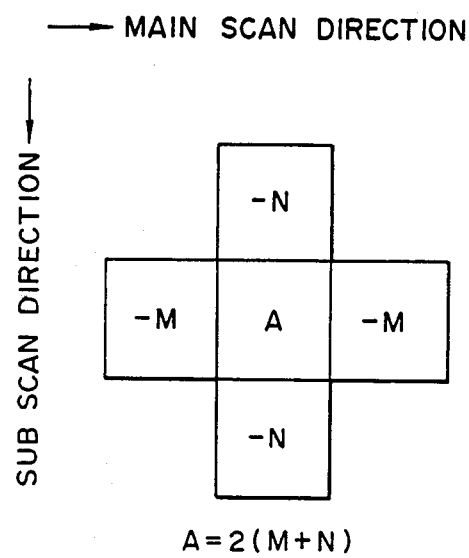

The coefficient of the operation for a picture cell A under consideration is illustrated in FIG. 13.

Figure 10:
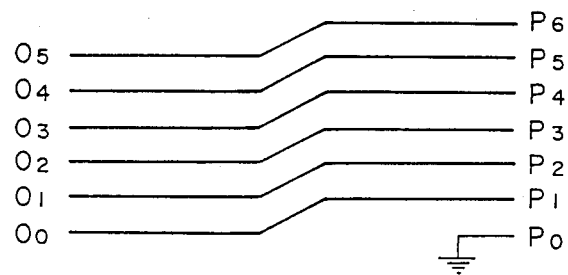
FIG. 10 shows a multiplier circuit, FIGS. 11A, 11B, 11C and 11D, assembled as shown in FIG. 11, illustrate a parallel multiplier circuit.

Referring again to FIG. 7, numeral 100 denotes a shift register which delays one line of video signal. Numeral 101 denotes a shift register, numeral 102 denotes a latch which delays one line of video signals, numerals 103–106 denote latches, numerals 107 and 109 denote adders and numerals 108 and 110 denote multiplier circuits. The multiplier circuits 108 and 110 have multipliers of 2. Their specific circuits are shown in FIG. 10 in which data lines are simply shifted. Symbol On denotes an input line and symbol Pn denotes an output line.

Figure 9:
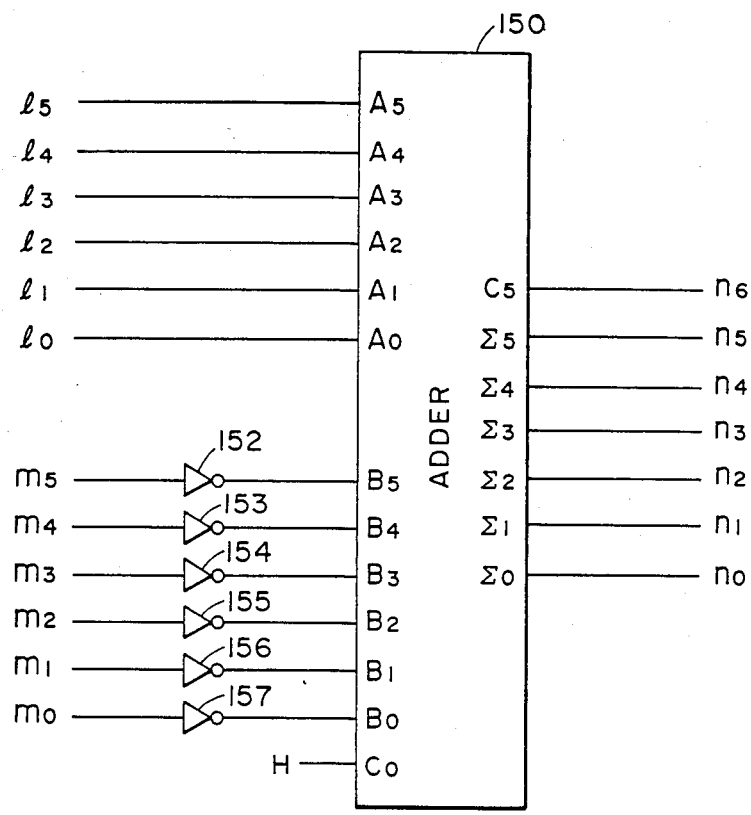
FIG. 9 shows a subtractor circuit.
Figure 11A:
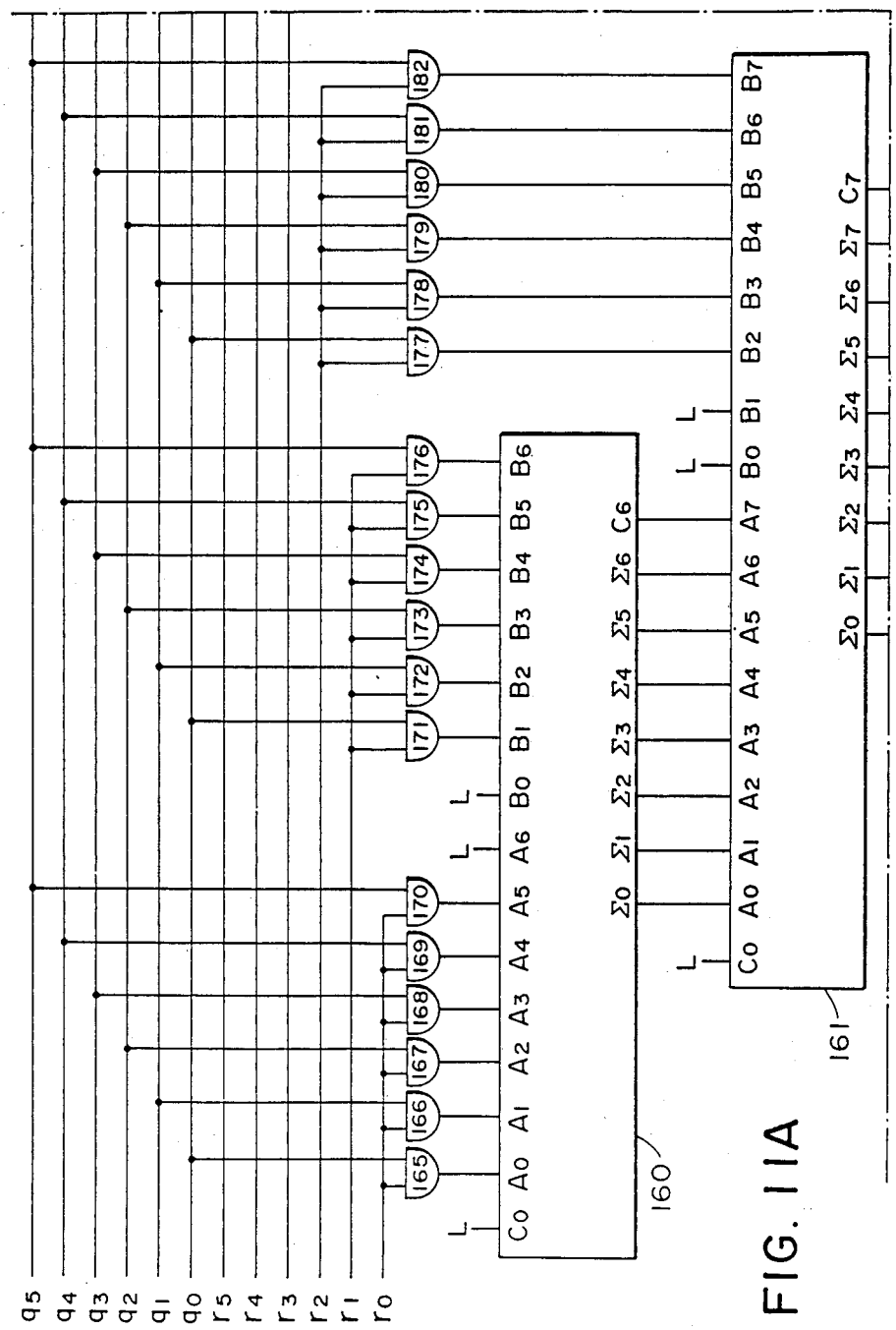
Figure 11B:
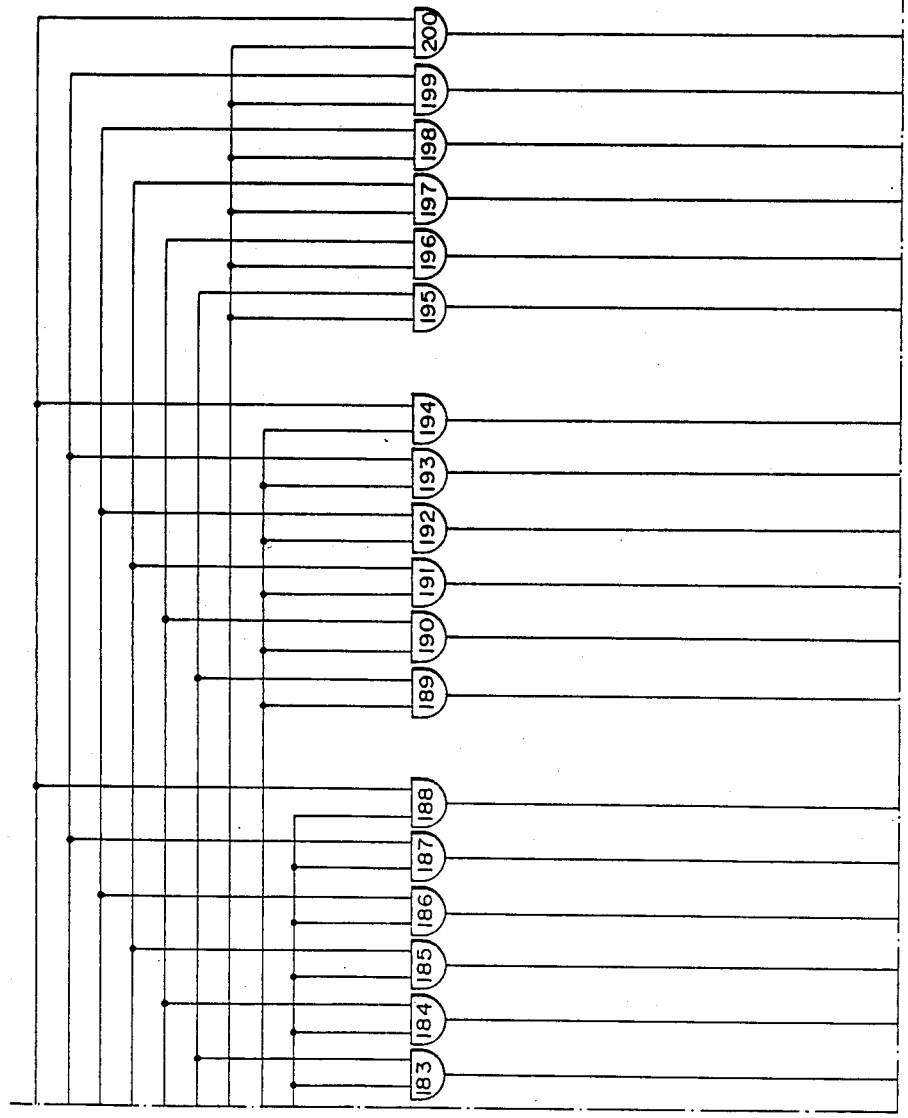
Figure 11D:
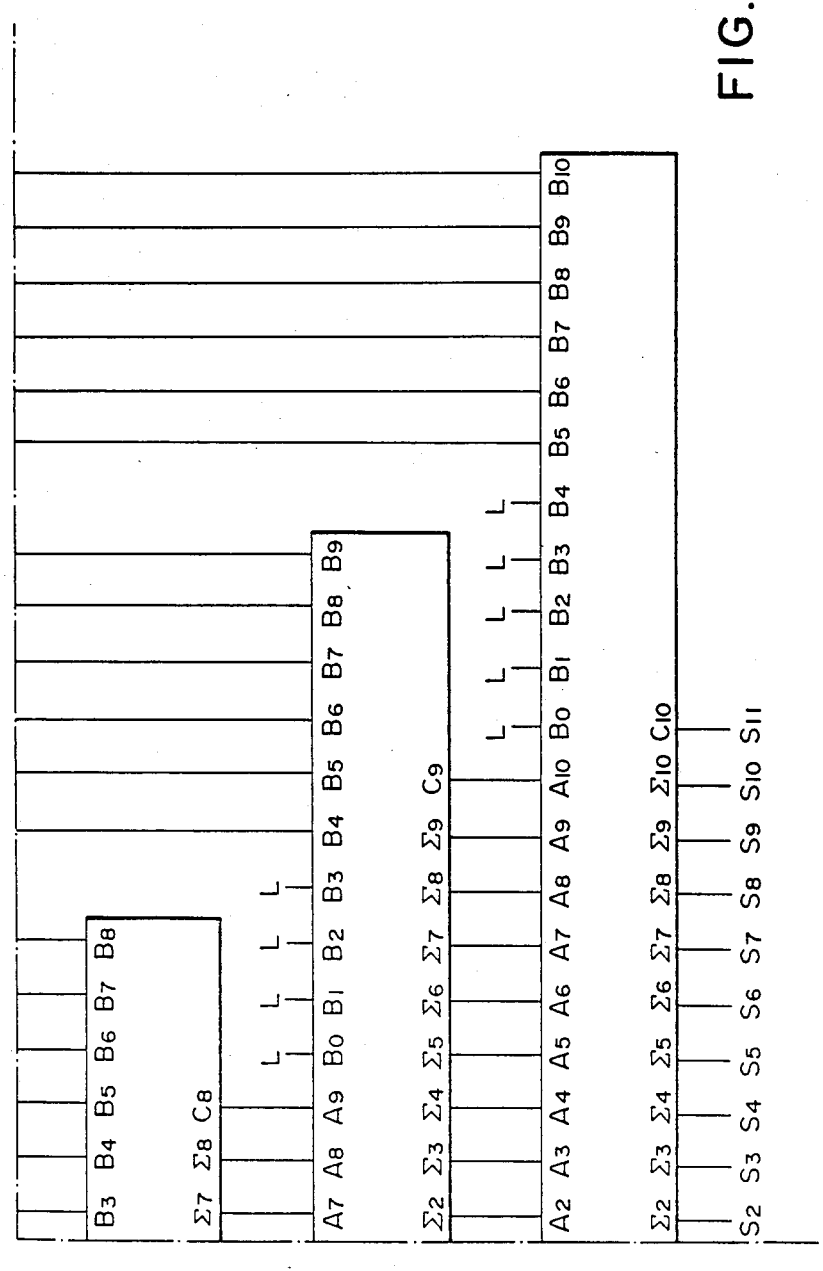

Numerals 111 and 112 denote subtractors which may be implemented by adders with 2's complementers as shown in FIG. 9, in which numeral 150 denotes an adder and numerals 152–157 denote inverters. In FIG. 7, numerals 113 and 115 denote multiplier circuits which may be parallel multiplier circuits as shown in FIG. 11, in which numerals 160–164 denote adders and numerals 165–200 denote AND circuits. Numerals 114 and 116 in FIG. 7 denote preset switches. The coefficient N is preset in the switch 114 and the coefficient M is preset in the switch 116. Numeral 117 denotes an adder and numeral 131 denotes a multiplier circuit which may be constructed as shown in FIG. 11. A data from the peak detector 11 (which will be explained later with reference to FIG. 17) is multiplied by a multiplier, as will be discussed later. Numeral 118 denotes an adder and numeral 119 denotes a latch.

Figure 28:
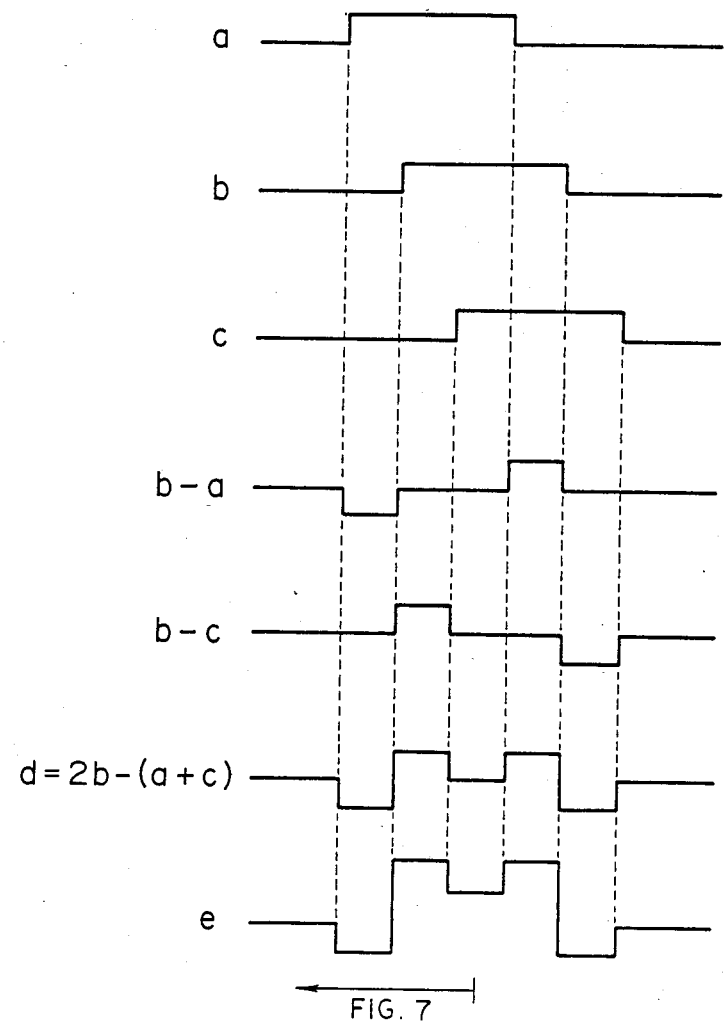
FIG. 28 shows logical waveforms of the circuit of FIG. 7.

Referring to FIG. 28, the operation of the circuit of FIG. 7 will be explained. The operation in the sub-scan direction is first explained. The shift registers 100 and 101 each store one CCD main scan line of image data delayed by one line. The outputs of the latches 104–106 for the respective picture cells are shown by a–c in FIG.

28. The outputs a-c are processed in accordance with 2b−(a+c) to produce an outline emphasized output d. The output d is multiplied by the coefficient N by the multiplier circuit 113 to change the level of the output d. The output of the multiplier circuit 113 is supplied to the adder 117 where it is added to the processed waveform in the main scan direction. In the multiplier circuit 131, the processed waveform is corrected for the spatial frequency as will be explained later. The output of the multiplier circuit 131 is added to the output of the latch 102 by the adder 118, which produces a sum output e. In this manner, the image data is outline-emphasized by the sub-scan direction coefficient N.

The operation in the main scan direction is similarly carried out and the image data which is outline-emphasized by the coefficient M is produced at the output of the multiplier circuit 115.

By processing the main scan direction differentitation coefficient and the sub-scan direction differentiation coefficient by the independent multiplier circuits, optimum defocus compensations in both the vertical direction and horizontal direction are attained. The multiplier circuit 131 is used to vary the differentiation coefficients M and N simultaneously and proportionally. An auto-equalizing control signal in frequency domain is applied to the multiplier circuit 131. The preset switches 114 and 116 may be replaced by control lines. In this case, if the differentiation coefficient M is $2^n$ times as large as the differentiation coefficient N, the signal lines may be simply shifted. Otherwise, a multiplier circuit (not shown) may be inserted in one of the control lines.

In the present embodiment, the outline emphasis circuit emphasizes the outline of the video signal in the main scan line and the sub-scan line, for the picture cell under consideration and the surrounding cells. Thus the defocus compensation is carried out in all directions. Since the differentiation coefficient M which is the correction coefficient for the main scan direction outline emphasis process in the outline emphasis circuit is selected to be larger than the sub-scan direction differentiation coefficient N, the resolving powers of the reproduced image in the main scan direction and the sub-scan direction are equal. As a result, the image reproduced by reading the text rotated by 90 degrees and the image reproduced by reading the non-rotated text are identical.

In the present embodiment, since the image data processed by the limiter 9 is processed for outline emphasis, spot noise data or undesired spot data on the text background are prevented from being emphasized.

(5) Outline Emphasis Circuit (II)

The digital outline emphasis circuit as shown in FIG. 7 requires a number of components. A large number of components are required particularly when a plurality of CCD's are included in the read device as shown in FIG. 2. By utilizing a characteristic of the digital circuit, a single outline emphasis circuit can be used in a time shared fashion as shown in FIG. 3. An embodiment thereof will now be explained.

Figure 8:
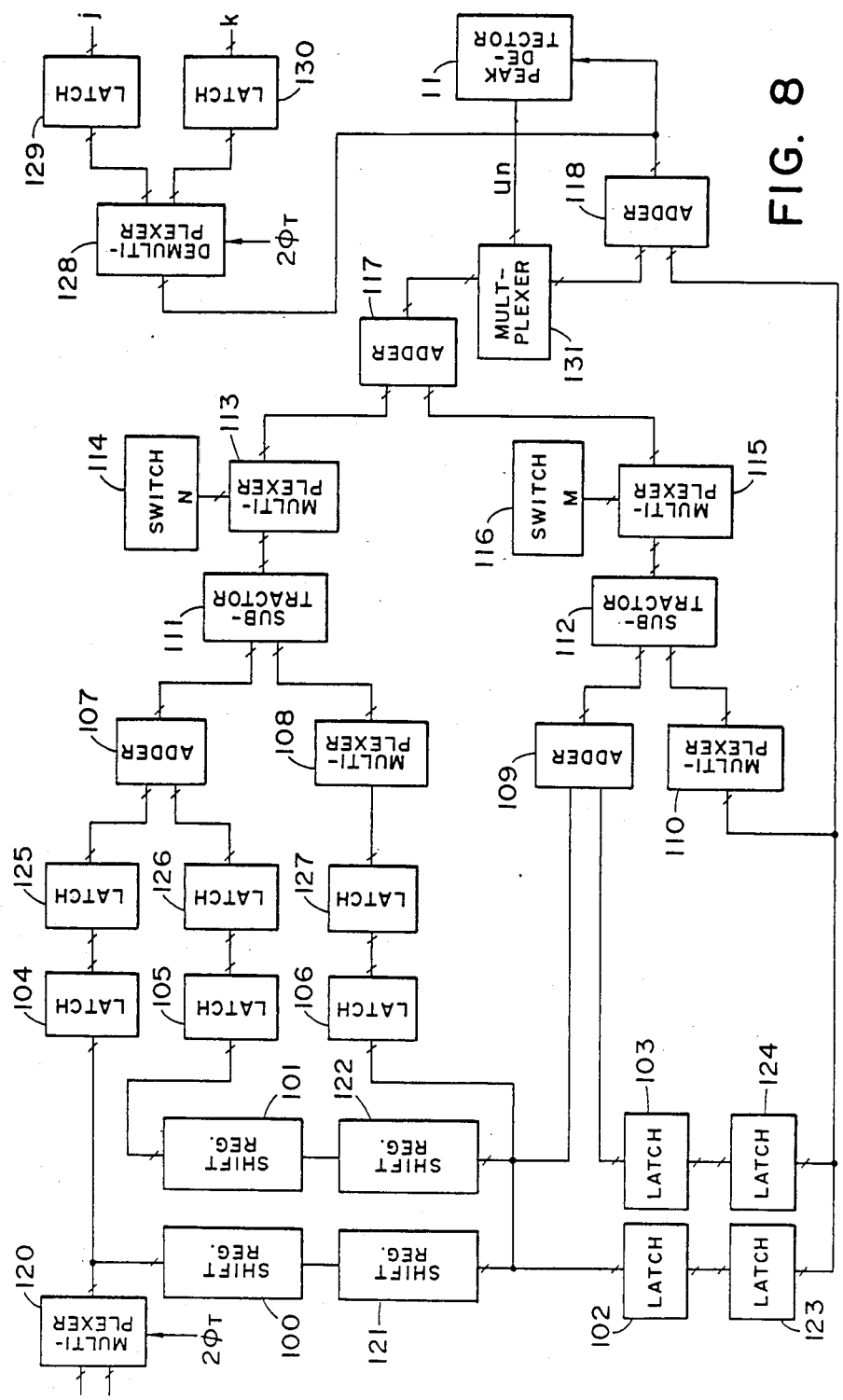
FIG. 8 shows an outline emphasis circuit for correcting defocusing which is used in a time shared fashion.

FIG. 8 shows a block diagram of one embodiment of the outline emphasis circuit which can be operated in time shared fashion. Symbols h and i denote digital signals which were A-D converted from the input video signals derived from CCD's driven in parallel. They are alternately selected by a multiplexer 120. A switching clock frequency of the multiplexer 120 is twice as high as that of the transfer clock $\phi_T$ of the video signal. The video signal from a single output line of the multiplexer 120 is filtered and then demultiplexed to two signal lines by a demultiplexer 128. Numerals 129 and 130 denote latches and symbols j and k denote latch outputs. The demultiplexer 128 is operated at the clock frequency of $2\phi_T$ and the latches 120 and 130 are operated at the clock frequency of $\phi_T$. All elements between the multiplexer 120 and the demultiplexer 128 are operated at the clock frequency of $2\phi_T$. The elements having the like functions to those of FIG. 7 are designated by like numerals.

The shift registers 100 and 101 each delay only one half line of the video signal because two video signals are alternately selected. Accordingly, delay line shift registers 121 and 122 are added to the shift registers 100 and 101, respectively. Latches 123-127 are also added. Two latches 102 and 123, for example, are required because the output data from the latch 123 and the output data from the shift register 121 come from the CCD of the same channel. The other elements are identical to those of FIG. 7. Accordingly, the number of components can be substantially reduced to in comparison with the case where two separate digital outline emphasis circuits are used.

While two video signals are used in the embodiment of FIG. 8, three or more video signals can be similarly processed by adding the shift registers and the latches depending on the number of video signals.

The present embodiment comprises a plurality of imaging devices for reading the text image, the A-D converter for converting the output video signals from the imaging devices to the digital video signals, the multiplexer for selecting the digital video signals in a time shared manner, the outline emphasis circuit for emphasizing the outline by comparing the delayed output digital signal from the multiplexer with the adjacent digital signal and the demultiplexer for demultiplexing the output of the outline emphasis circuit into the plurality of outputs corresponding to the respective converters. Accordingly, only one outline emphasis circuit is required and the number of components is reduced and hence the cost is reduced.

(6) Auto-equalization of the video signal (image signal) in the frequency domain The MTF 221 of the lens shown in FIG. 21. The frequency characteristic of the CCD 3 including the lens is not always constant but the frequency characteristic is variable because of a variance of the semiconductor device such as CCD. The MTF of the lens 2 is materially affected by slight defocusing. When light quantity is controlled by the aperture of the lens, the MTF is lowered as the aperture is increased. It is difficult to manually compenate for those variable factors of the frequency characteristic.

In the present embodiment, the video signal is automatically equalized in the frequency domain.

In order to automatically equalize the video signal in the frequency domain, the frequency characteristic of the video signal in the main scan direction is measured. When a second order digital filter is used in the main scan direction outline emphasis circuit (that is, when two multipliers are included), the coefficient can be determined from the frequency characteristics at any three points. When the coefficient is symmetric about the picture cell under consideration as shown in FIG.

13, the frequency characteristics at two points are sufficient.

In order to measure the video signal including the optical system, a test chart as shown in FIG. 14 is used. A lower half of the test chart shows a low spatial frequency pattern and an upper half shows a pattern having a spatial frequency equal to or near a Nyquist limit. The lower half may be entirely black. This test chart is read and a peak value $V_{LF}$ of the black level in the lower half area and a peak value $V_{HF}$ of the black level in the upper half area are sampled and held to determine the transfer characteristic of the video signal. The video signal is automatically equalized in the frequency domain by increasing or decreasing the differentiation coefficient (multiplier of the multiplier circuit 131) of the outline emphasis circuit (digital filter) of the FIG. 7 embodiment until a difference between $V_{LF}$ and $V_{HF}$ reaches zero.

Figure 15:
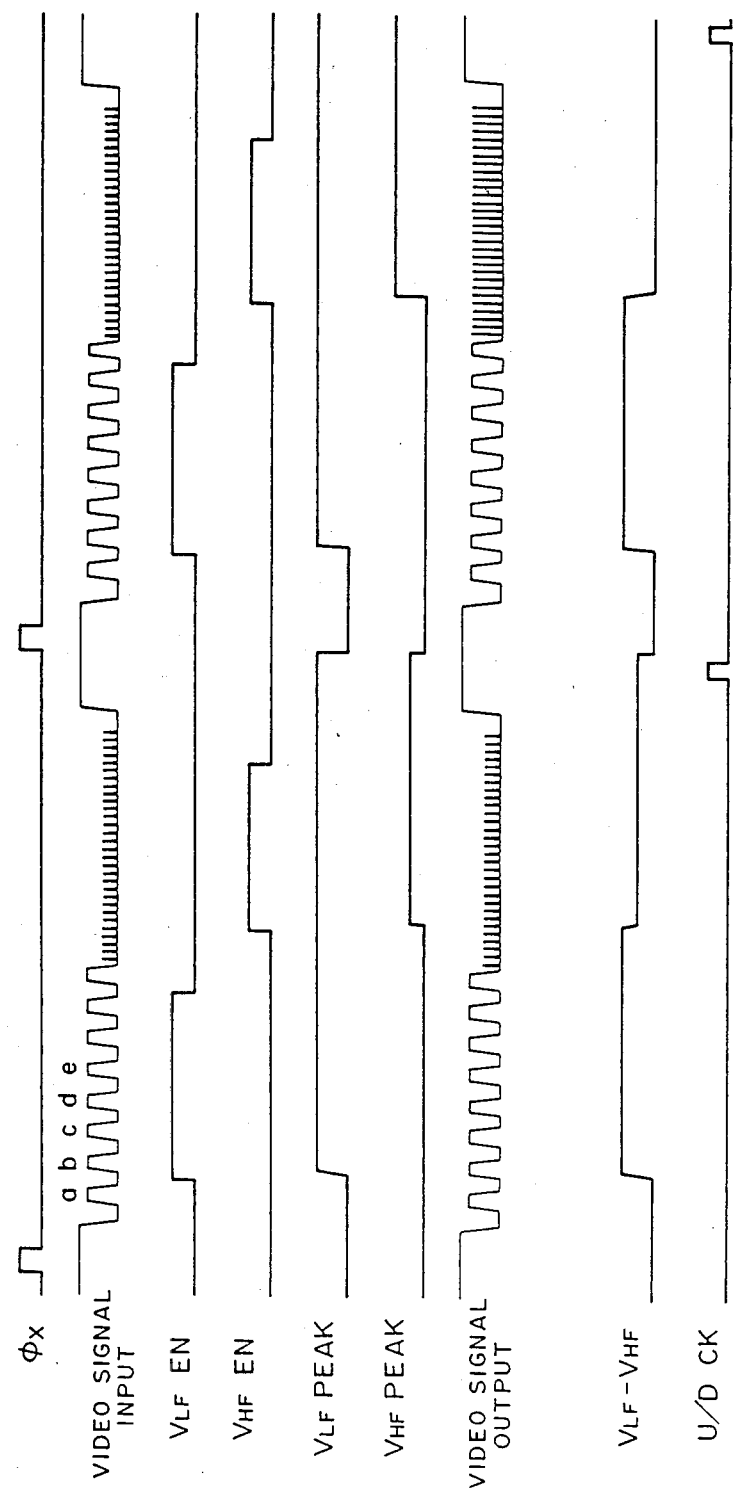
FIG. 15 shows an example of an automatic equalizing time chart.
Figure 17:
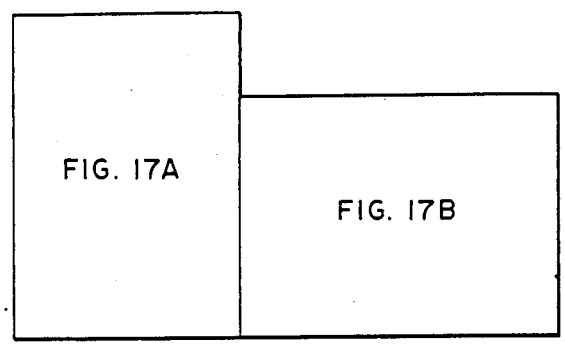
Figure 17A:
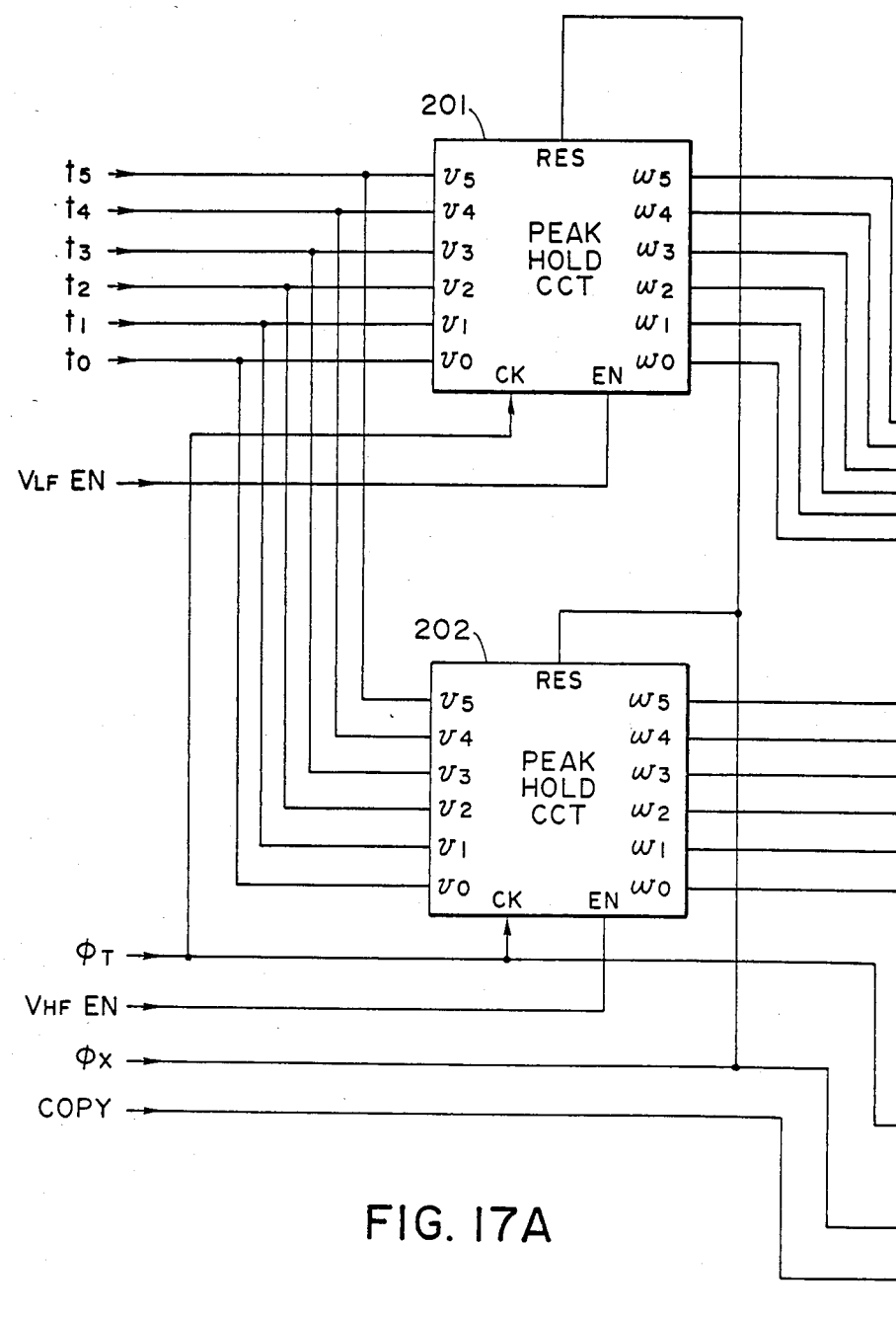
Figure 17B:
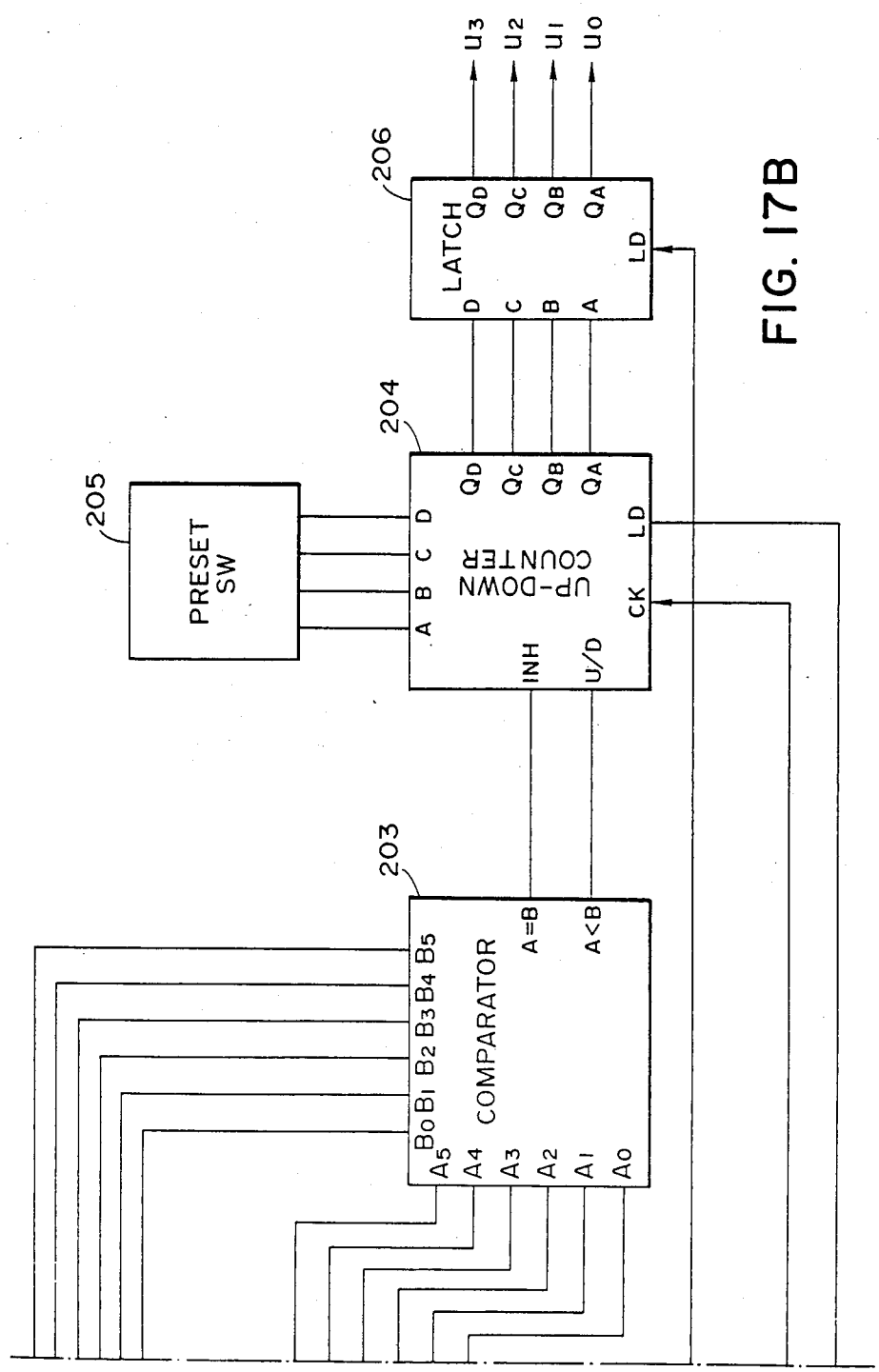

FIGS. 17A and 17B show an embodiment of a peak detector which compares the peak values $V_{LF}$ and $V_{HF}$ to control the multiplier circuit 131. Symbol tn (n=0, 1, 2, ...) denotes a video signal input terminal, symbol un denotes a differentiation coefficient control output terminal, numerals 201 and 202 denote peak hold circuit which may be those shown in FIG. 18. The peak hold circuit 201 holds the peak value $V_{LF}$. Symbol $V_{LF}$ EN denotes an enable signal which is timed as shown in FIG. 15. The peak hold circuit 202 holds the peak value $V_{HF}$. Symbol $V_{HF}$ EN denotes an enable signal. An output $V_{LF}$ PEAK of the peak hold circuit 201 and an output $V_{HF}$ PEAK of the peak hold circuit 202 are shown in analog fashion in FIG. 15. The outputs $L_{LF}$ PEAK and $V_{HF}$ PEAK are compared by a magnitude comparator 203. Numeral 204 denotes an up-down counter which counts the horizontal synchronizing signal $\phi_X$. Numeral 205 denotes a preset switch which sets an initial differentiation coefficient for the multiplier circuit 131. The setting in the preset switch 205 is loaded to the up-down counter 204 by the vertical synchronizing signal COPY. Numeral 206 denotes a latch. The peak detector 11 of FIG. 17 is located at 11 in FIG. 1. It is also located at 11 in FIGS. 7 and 8 to control the multiplier of the multiplier circuit 131. The input to the peak detector 11 of FIG. 7 may be the output g of the latch 119. The multiplier 131 has different weightings (amplitudes) for the sum output of the main scan direction differentiation coefficient and the sum output of the sub-scan direction differentiation coefficient. The correction of the frequency characteristic in the sub-scan direction depends on the correction in the main scan direction. A defocusing factor common to the main scan direction and the sub-scan direction such as the MTF of the lens can be compensated by this system to a practically sufficient extent. In FIG. 7, two peak detectors 11 may be provided one for the main scan direction and one of the sub-scan direction to independently control the multiplier circuits 113 and 115. In this case, the frequency characteristic in the sub-scan direction is measured by a test chart (not shown) which is a 90°-rotated version of the test chart shown in FIG. 14.

Referring to a time chart for the auto-equalization shown in FIG. 15, symbols a, b, c, d, e, ... on the video signal inputs correspond to the black lines a, b, c, d, e, ... on the test chart shown in FIG. 14. In the first line scan, the video signal output is a duplicated of the input signal, but in the second line scan the amplitude $V_{HF}$ of the higher spatial frequency video signal is equalized to the amplitude $V_{LF}$ of the lower spatial frequency video signal. This shows that the equalization has been carried out.

Figure 16:
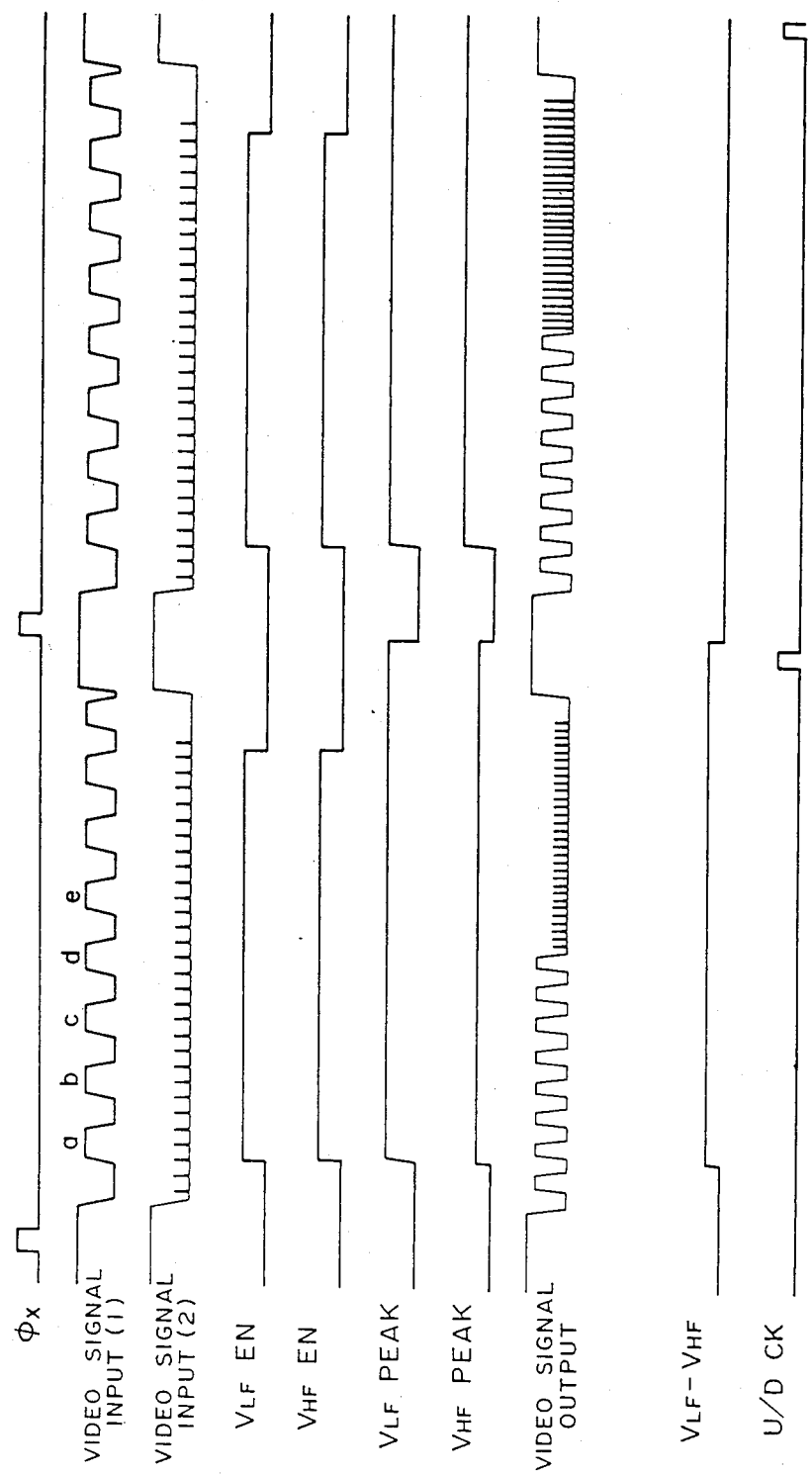
FIG. 16 shows another example of the automatic equalizing time chart, FIGS. 17A and 17B, assembled as shown in FIG. 17, illustrate a peak detector circuit.

FIG. 16 shows a time chart for the auto-equalization when two CCD imaging devices are used as shown in FIGS. 2 and 3. After the equalization, the count operation of the up-down counter 204 is stopped by a sequence controller, not shown. In this manner, the transfer characteristic of the video signal including the optical system can be automatically equalized in the frequency domain. While the second order equalizing filter (digital filter) has been explained, a third or higher order filter may be used to more precisely equalize the video signal. While the test chart shown in FIG. 14 has separately arranged low spatial frequency pattern and high spatial frequency pattern, those patterns may be arranged in mixed fashion so long as they can be separated by an appropriate band-pass filter. The same is true for the sub-scan direction. In this case, the band-pass filter may be either analog or digital, but the digital filter is suitable for the measurement of the frequency characteristic in the sub-scan direction.

With the arrangement described above, the transfer characteristic of the video signal including the optical system can be automatically equalized in the spatial frequency domain.

The output of the peak detector may be used in the following manners. In a first example, the output of the peak detector is divided by two to use as a reference level of a comparator which receives the CCD output of digitizing the CCD output. In a second example, the peak detector output is displayed. In a third example, the peak detector output is used in place of the outputs of the present switches 114 and 116. In this example, a low level of the background can be detected so that the background level is raised.

Figure 24:
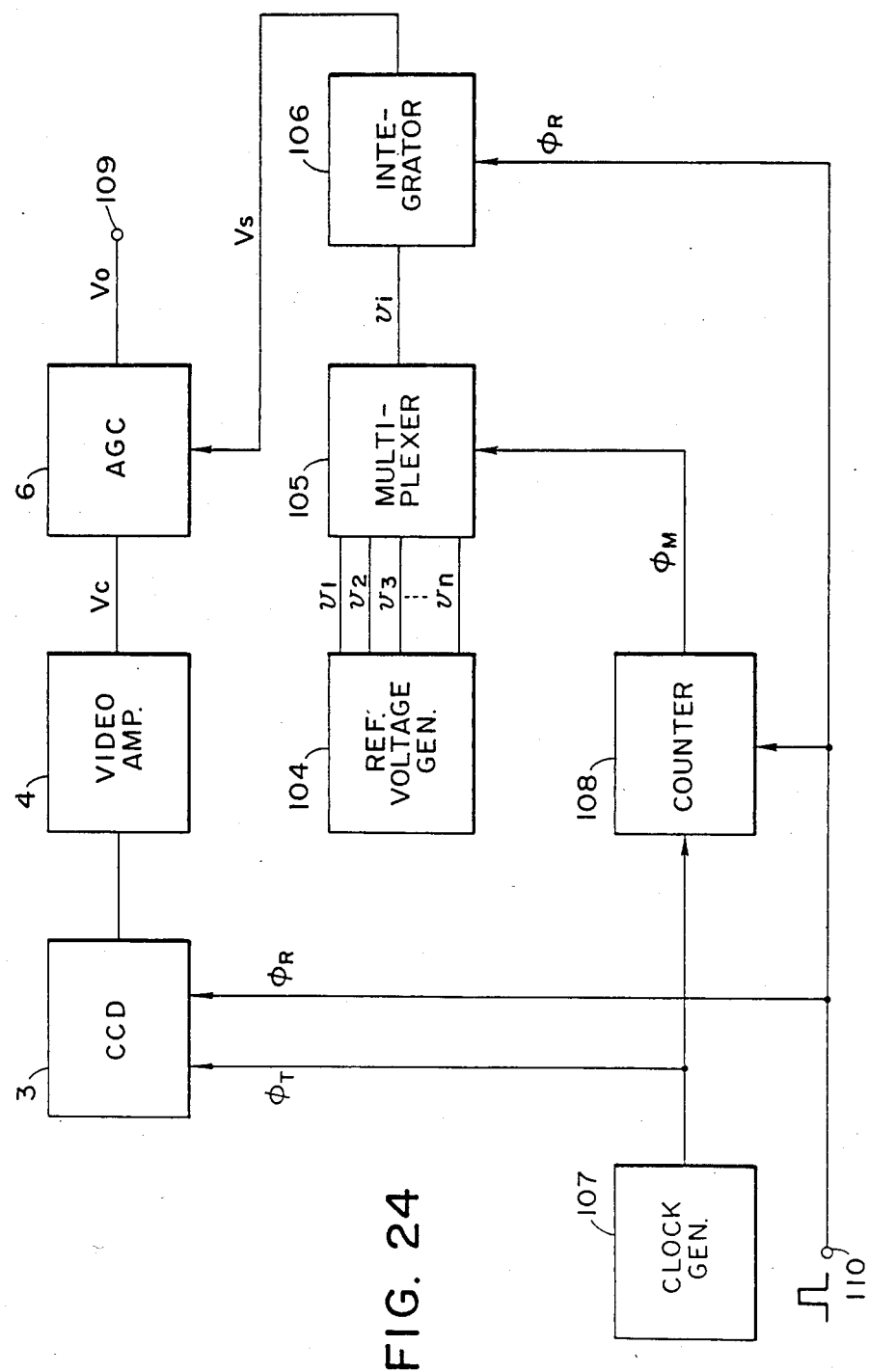
FIG. 24 is a block diagram of a shading correction circuit.

Referring to FIG. 24, an AGC circuit having a shading correction function will be explained in detail.

FIG. 24 shows a block diagram of a shading correction circuit. Numeral 3 denotes the CCD in which charges stored in the respective cells are shifted to transfer gates in synchronism with a synchronizing signal $\phi_R$ and the charges are transferred bit by bit in synchronism with the transfer pulse $\phi_T$ to produce an output. Numeral 4 denotes the D.C. video amplifier which may include the ALC circuit for stabilizing the black level described above. Numeral 6 denotes the automatic gain control circuit for stabilizing and controlling the amplification gain for the output signal $V_c$ of the D.C. amplifier 4. Numeral 104 denotes a reference voltage generator which generates n reference voltages $V_1, V_2, \ldots V_n$ by potentiometers. Numeral 105 denotes a multiplexer which selects the reference voltage $V_i$ (i=1, 2, ... n) in accordance with a reference signal selection signal $\phi_M$. Numeral 106 denotes an integrator which integrates the reference voltage $V_i$ to produce an output $V_s$. Whenever the synchronizing signal $\phi_R$ is applied, the output $V_s$ is reset to zero independently of the reference voltage $V_i$. Numeral 107 denotes a clock generator, and numeral 108 denotes a counter. When a total number of bits of the cells of the CCD 3 is, for example, 1024 ($=2^{10}$), the counter 108 comprises ten binary counters. The reference voltage selection signal $\phi_M$ uses several high order bits of the binary counters. When the synchronizing signal $\phi_R$ is applied, the binary counters are reset to "0,000,000,000". Numeral 109 denotes an output terminal of the video signal $V_o$ and numeral 110 denotes an input terminal of the synchronizing signal $\phi_R$. The number n of the reference voltages of the reference voltage generator 104 is selected to be equal to $2^K(K=2-4)$ from the standpoint of the precision of segment approximation and the cost. The n-point segment approximation uses k high order bits of the counter 108. For example, for a four-point segment approximation, two high order bits of the counter 108 are used as the reference voltage selection signal $\phi_M$. It is assumed that a gain G of the gain control circuit 6 is a linear function of the integrated output $V_s$. That is, $$G = KV_s \qquad (7)$$

where K is a constant. Accordingly, the video output $V_o$ is expressed as a function of the CCD output $V_c$ as follows.

$$V_o = KV_s V_c \qquad (8)$$

When the CCD output includes a shading component, the CCD output $V_c$ can be generally expressed by:

$$V_c = \xi V_c \qquad (9)$$

where $\xi$ is a shading characteristic and $V_c$ is actual video information. Accordingly, by imparting a reverse characteristic of the shading characteristic to the integrated output $V_s$, that is, when $$V_s = 1/\xi \qquad (10)$$

the shading characteristic can be eliminated. Namely, $$\begin{aligned}V_o &= KV_s \cdot V_c \\ &= K\,1/\xi \cdot \xi \cdot v_c \\ &= Kv_c\end{aligned} \qquad (11)$$

In this manner, the shading term in the video output $V_o$ is eliminated.

Actually, it is difficult to obtain a perfect reverse shading characteristic $1/\xi$ but a 4–16 points segment approximation is practically acceptable.

An embodiment of the four-point segment approximation (n=4) is now explained.

Figure 25:
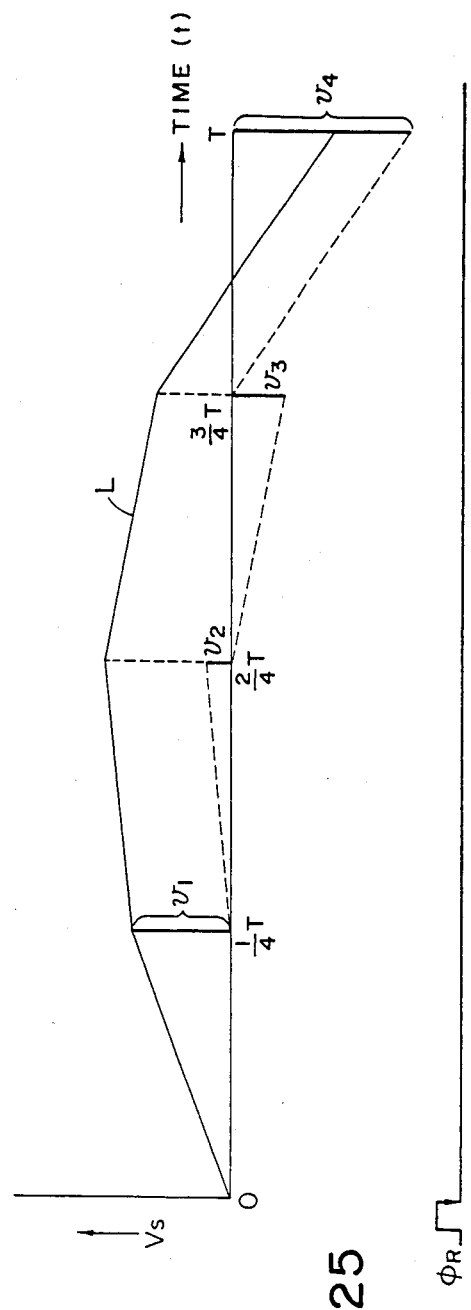
FIG. 25 is a four-point segment approximated time chart.

FIG. 25 shows a time chart for the four-point segment approximation.

By way of example, the number of picture cells per line of the CCD 1 is selected to be 1024 bits. The count of the counter 108 is shown in binary notation as CNT and two high order bits of CNT (MSB) are used as the reference voltage selection signal $\phi_M$, which is shown in decimal notation. Since the 1024 bits of CCD cells are equally divided by four, the reference voltages $V_1$–$V_4$ are sequentially selected by applying $\phi_M$ to the multiplexer 105. A scanning time of the CCD is shown by T. The counter 108 is reset by the falling edge of the synchronizing signal $\phi_R$ to start the scan. An integration constant of the integrator 106 is given by n/T.

The integrated output $V_s$ at a given time t (where $$\frac{\phi_M + 1}{n} T > t \geq \frac{\phi_M}{n} T,$$

$\phi_M$ is expressed in decimal notation) is expressed as follows:

$$\begin{aligned}V_s &= \sum_{i=1}^{\phi_M} \frac{n}{T} \int_{\left(\frac{i-1}{n}\right)T}^{\frac{i}{n}T} v_i\, dt + \frac{n}{T} \int_{\frac{\phi_M}{n}T}^{t} v_{(\phi_M+1)}\, dt \\ &= \sum_{i=1}^{\phi_M} v_i + \frac{n}{T} v_{(\phi_M+1)} \left(t - \frac{\phi_M}{n} T\right)\end{aligned} \qquad (12)$$

For example, when $\phi_M = 2$, that is, when $(\tfrac{3}{4})T > t \geq (2/4)T$, $$\begin{aligned}V_s &= \sum_{i=1}^{2} v_i + \frac{4}{T} v_3 \left(t - \frac{2}{4} T\right) \\ &= v_1 + v_2 + v_3 \left(\frac{4}{T} t - 2\right)\end{aligned} \qquad (13)$$

Similarly, when t=T, $$V_s = v_1 + v_2 + v_3 + v_4 \qquad (4)$$

Accordingly, the integrated output $V_s$ as shown by the segment graph L of FIG. 25 is produced.

In order for the integrated output $V_s$ to be the segment approximation which represents the equation (10), the reference voltages $v_1$–$v_n$ should be selected such that the respective points of $V_s$ coincide with $1/\xi$. Since both $V_s$ and $\xi$ are functions of time, they are represented $V_s$ (t) and $\xi$ (t), respectively. Thus, the points of the segment approximation are represented by $$V_s\left(\frac{\phi_M + 1}{n} T\right) \text{ and } \xi\left(\frac{\phi_M + 1}{n} T\right),$$

respectively. From the equation (12), we get $$\begin{aligned}V_s\left(\frac{\phi_M + 1}{n} T\right) &= \sum_{i=1}^{\phi_M} v_i + \\ &\quad \frac{n}{T} v_{(\phi_M+1)} \left(\frac{\phi_M + 1}{n} T - \frac{\phi_M}{n} T\right) \\ &= \sum_{i=1}^{\phi_M} v_i + v_{(\phi_M+1)}\end{aligned} \qquad (15)$$

By placing the equation (15) in the equation (10), we get $$v_{(\phi_M + 1)} + \sum_{i=1}^{\phi_M} v_i = 1/\xi\left(\frac{\phi_M + 1}{n} T\right)$$

$$v_{(\phi_M + 1)} = 1/\xi\left(\frac{\phi_M + 1}{n} T\right) - \sum_{i=1}^{\phi_M} v_i$$

Accordingly, $$\left.\begin{array}{l} v_1 = 1/\xi \left( \dfrac{T}{n} \right) \\ v_2 = 1/\xi \left( 2\dfrac{T}{n} \right) - v_1 \\ v_3 = 1/\xi \left( 3\dfrac{T}{n} \right) - (v_1 + v_2) \\ v_n = 1/\xi (T) - (v_1 + v_2 + \ldots + v_{n-1}) \end{array}\right\} \quad (16)$$

Thus, by selecting the reference voltages as shown in the equations (16), the shading can be corrected.

FIG. 26 shows a block diagram of the linear sensor of the picture imaging device CCD (C$^4$D of Fairchild Semiconductor Corporation). The exposure section is designated by a which accumulates an electric charge which corresponds to the accepted light level when the sensor is exposed, b denotes the transfer section consisting of a shift register which is used to perform serial transfer of an electric charge, c denotes the generator section which generates clock pulses used for the transfer, and d designates the circuit which samples and holds the transferred data sequentially.

Figure 27:
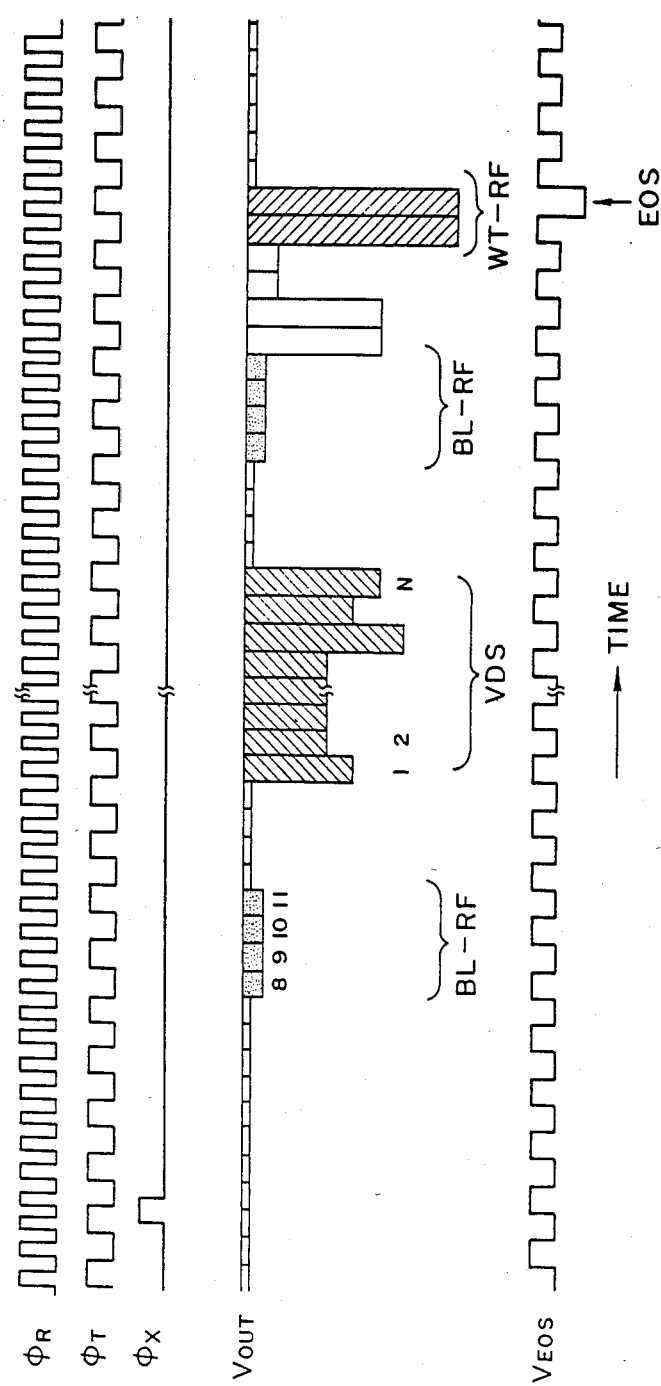
FIG. 27 is a time chart for the CCD shown in FIG. 26.

The process of data transfer will be described referring to the CCD signal timing chart shown in FIG. 27. The photons, which have been accumulated in the exposure section a of FIG. 26 for a predetermined time, are transferred, each cell of the exposure section a at the same time, to the shift register of FIG. 1B by the pulse $\phi_X$ shown in FIG. 27. $\phi_T$ of FIG. 27 is the transfer clock for the shift register b. The data that have been transferred are input sequentially to the hold circuit d of FIG. 2 and then output. $\phi_R$ of FIG. 27 is the reset pulse for the hold circuit d. $V_{out}$ of FIG. 27 is the picture signal which contains, besides the real picture signal, reference black level signal BL-RF and reference white level signal WT-RF. Those reference signals are the pulses on the right side of the read out signal $V_{DS}$ of FIG. 27 and are output by the CCD itself. The high level (EOS) of $V_{EOS}$ shown in FIG. 27 is the end of scan signal which is output every time the scanning ends.

By the transfer scanning for one line, the hold circuit d outputs low level BL-RF signal, then, the read out signal $V_{DC}$, again the BL-RF, and finally the high level WT-RF of reference white signal as $V_{out}$. At the same time the $V_{EOS}$ port senses the high level and outputs end signal EOS for one line. The output $V_{OUT}$ is input to the Video (amp) shown in FIGS. 1-3.

What I claim is:

1. Signal processing apparatus comprising:
    an A/D converter for converting an input analog signal to a first digital signal;
    level control means operable to compare the value of the first digital signal at a first time with a first predetermined digital value to provide a first feedback signal to control the level of the input analog signal;
    gain control means operable to compare the value of the first digital signal at a second time with a second predetermined digital value to provide a second feedback signal to control gain of the input analog signal; and
    digital process means for performing a predetermined digital process on said first digital signal to produce a second digital signal.

2. Signal processing apparatus according to claim 1, wherein said level control means includes an adder circuit for adding said first feedback signal to said input analog signal.

3. Signal processing apparatus according to claim 1 or 2, wherein said gain control means includes a multiplier circuit for multiplying said input analog signal by said second feedback signal.

4. Signal processing apparatus according to claim 1, wherein said input analog signal is an image signal.

5. Signal processing apparatus according to claim 4, wherein the value of the first digital signal at said first time represents a reference black level.

6. Signal processing apparatus according to claim 4 or 5, wherein the value of the first digital signal at the second time represents white.

7. Signal processing apparatus according to claim 6, including peak detector means for detecting the peak value of the first digital signal, said gain control means being operable to compare said peak value with said second predetermined digital value.

8. Signal processing apparatus according to claim 4 or 5, wherein said digital process means includes an outline emphasis circuit.

9. Signal processing apparatus according to claim 4 or 5, wherein said digital process means includes a dither process circuit.

10. Signal processing apparatus according to claim 4 or 5, further including reader means for reading an image to be read to generate said image signal.

* * * * *

UNITED STATES PATENT AND TRADEMARK OFFICE
CERTIFICATE OF CORRECTION

PATENT NO. : 4,748,677

DATED : May 31, 1988

INVENTOR(S) : YOSHIKAZU YOKOMIZO

Page 1 of 4

It is certified that error appears in the above-identified patent and that said Letters Patent is hereby corrected as shown below: Title page:

AT [57] IN THE ABSTRACT

Line 8, "again" should read --a gain--.

IN THE DRAWINGS

Sheet 11, Figure 7, " SUB TRACTOR " should read -- SUB TRACTER -- (both occurrences).

Sheet 12, Figure 8, " SUB TRACTOR " should read -- SUB TRACTER -- (both occurrences).

COLUMN 1

Line 19, "affect" should read --effect--.
Line 25, "of major" should read --of the major--.
Line 39, "dizzer" should read --dither--.
Line 44, "On contrary, if the" should read --On the contrary, if--.
Line 66, "produced" should read --reproduced--.

COLUMN 2

Line 63, "ready" should read --read--.

COLUMN 3

Line 29, "subtractor" should read --subtracter--.

UNITED STATES PATENT AND TRADEMARK OFFICE
CERTIFICATE OF CORRECTION

PATENT NO. : 4,748,677

DATED : May 31, 1988

INVENTOR(S) : YOSHIKAZU YOKOMIZO

It is certified that error appears in the above-identified patent and that said Letters Patent is hereby corrected as shown below:

COLUMN 4

Line 59, "dizzer" should read --dither--.
Line 60, "dizzer" should read --dither--.

COLUMN 5

Line 55, "quantitized" should read --quantized--.

COLUMN 6

Line 3, "terminal $\theta_n$" should read --terminal $Q_n$--.
Line 39, "the "L"" should read --the "L" level--.
Line 47, "an" should be deleted.
Line 48, "to" should be deleted.
Line 53, ""H"" should read --an "H" level--.

COLUMN 7

Line 12, "shows" should be deleted.
Line 38, "A$\cap$B" should read --A>B--.

COLUMN 8

Line 41, "diagramatically" should read --diagrammatically--.
Line 44, "are" should read --is--.
Line 60, "are" should read --is--.

UNITED STATES PATENT AND TRADEMARK OFFICE
CERTIFICATE OF CORRECTION

PATENT NO. : 4,748,677

DATED : May 31, 1988

INVENTOR(S) : YOSHIKAZU YOKOMIZO

It is certified that error appears in the above-identified patent and that said Letters Patent is hereby corrected as shown below:

COLUMN 9

Line 34, "one-dimension" should read --one-dimensional--.
Line 58, "characteristics" should read --characteristic--.

COLUMN 10

Line 45, "subtractors" should read --subtracters--.

COLUMN 12

Line 47, "shown" should read --is shown--.

COLUMN 14

Line 14, "separately" should read --a separately--.
Line 30, "of" should read --for--.
Line 33, "present" should read --preset--.

COLUMN 15

Line 35, "$= K\ 1/\zeta \cdot \zeta \cdot v_c$" should read --$= K\ 1/\xi \cdot \xi \cdot v_c$--.
Line 50, "CCD 1" should read --CCD 3--.

COLUMN 16

Line 34, "represented" should read --represented as--.

UNITED STATES PATENT AND TRADEMARK OFFICE
CERTIFICATE OF CORRECTION

PATENT NO. : 4,748,677

DATED : May 31, 1988

INVENTOR(S) : YOSHIKAZU YOKOMIZO

It is certified that error appears in the above-identified patent and that said Letters Patent is hereby corrected as shown below:

COLUMN 17

Line 42, "read out" should read --read-out--.
    Line 47, "read out" should read --read-out--.

COLUMN 18

Line 15, "gain" should read --a gain--.

Signed and Sealed this

Seventh Day of February, 1989

Attest:

DONALD J. QUIGG

*Attesting Officer*  *Commissioner of Patents and Trademarks*